(12) United States Patent
Wilson et al.

(10) Patent No.: US 10,494,470 B2
(45) Date of Patent: *Dec. 3, 2019

(54) POST POLYMERIZATION CURE SHAPE MEMORY POLYMERS

(71) Applicant: LAWRENCE LIVERMORE NATIONAL SECURITY, LLC, Livermore, CA (US)

(72) Inventors: Thomas S. Wilson, San Leandro, CA (US); Michael Keith Hearon, Boston, MA (US); Jane P. Bearinger, Berwyn, PA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/387,256

(22) Filed: Dec. 21, 2016

(65) Prior Publication Data

US 2017/0198080 A1 Jul. 13, 2017

Related U.S. Application Data

(60) Continuation of application No. 13/892,719, filed on May 13, 2013, now Pat. No. 9,540,481, which is a division of application No. 13/099,146, filed on May 2, 2011, now Pat. No. 8,883,871.

(60) Provisional application No. 61/332,039, filed on May 6, 2010.

(51) Int. Cl.

| | | |
|---|---|---|
| *C08J 3/24* | (2006.01) | |
| *C08J 5/00* | (2006.01) | |
| *C08G 18/32* | (2006.01) | |
| *B29C 48/03* | (2019.01) | |
| *B29C 67/20* | (2006.01) | |
| *B29C 71/02* | (2006.01) | |
| *B29C 71/04* | (2006.01) | |
| *C08G 18/67* | (2006.01) | |
| *C08G 18/72* | (2006.01) | |
| *C08G 18/73* | (2006.01) | |
| *C08G 18/75* | (2006.01) | |
| *C08G 63/52* | (2006.01) | |
| *C08G 18/83* | (2006.01) | |
| *B29C 45/00* | (2006.01) | |
| *B29C 61/06* | (2006.01) | |
| *B29C 48/00* | (2019.01) | |
| *B29C 51/00* | (2006.01) | |
| *C08G 101/00* | (2006.01) | |
| *B29K 75/00* | (2006.01) | |
| *B29K 105/04* | (2006.01) | |

(52) U.S. Cl.
CPC ...... *C08G 18/3206* (2013.01); *B29C 45/0001* (2013.01); *B29C 48/03* (2019.02); *B29C 61/06* (2013.01); *B29C 67/20* (2013.01); *B29C 71/02* (2013.01); *B29C 71/04* (2013.01); *C08G 18/673* (2013.01); *C08G 18/675* (2013.01); *C08G 18/722* (2013.01); *C08G 18/73* (2013.01); *C08G 18/758* (2013.01); *C08G 18/83* (2013.01); *C08G 63/52* (2013.01); *B29C 48/00* (2019.02); *B29C 51/00* (2013.01); *B29C 51/002* (2013.01); *B29K 2075/00* (2013.01); *B29K 2105/04* (2013.01); *C08G 2101/00* (2013.01); *C08G 2280/00* (2013.01)

(58) Field of Classification Search
CPC .................................................................
B29C 45/0001; B29C 47/0009; B29C 61/06; B29C 67/20; B29C 71/02; B29C 71/04; B29C 47/00; B29C 51/00; B29C 51/002; B29C 48/03; B29C 48/00; C08G 18/3206; C08G 18/673; C08G 18/675; C08G 18/722; C08G 18/73; C08G 18/758; C08G 18/83; C08G 63/52; C08G 2101/00; C08G 2280/00; B29K 2075/00; B29K 2105/04

See application file for complete search history.

(56) References Cited

U.S. PATENT DOCUMENTS

| | | |
|---|---|---|
| 3,088,934 A | 5/1963 | Bonanni |
| 4,271,273 A | 6/1981 | Biranowski et al. |
| 6,022,550 A | 2/2000 | Watanabe |
| 6,596,818 B1 | 7/2003 | Zamore |
| 6,664,335 B2 | 12/2003 | Krishnan |
| 7,538,163 B2 | 5/2009 | Bezuidenhout et al. |
| 8,883,871 B2 | 11/2014 | Wilson et al. |

(Continued)

FOREIGN PATENT DOCUMENTS

| | | |
|---|---|---|
| CA | 2798450 | 11/2011 |
| EP | 2075272 | 7/2009 |

(Continued)

OTHER PUBLICATIONS

European Patent Office, Supplementary European Search Report as dated Jan. 5, 2018 in European Patent Application No. 11778281.3, 6 pages.

(Continued)

*Primary Examiner* — Irina S Zemel
(74) *Attorney, Agent, or Firm* — Edwin E. Richards

(57) ABSTRACT

This invention relates to chemical polymer compositions, methods of synthesis, and fabrication methods for devices regarding polymers capable of displaying shape memory behavior (SMPs) and which can first be polymerized to a linear or branched polymeric structure, having thermoplastic properties, subsequently processed into a device through processes typical of polymer melts, solutions, and dispersions and then crossed linked to a shape memory thermoset polymer retaining the processed shape.

26 Claims, 18 Drawing Sheets

(56) References Cited

U.S. PATENT DOCUMENTS

2002/0065373 A1    5/2002    Krishnan
2006/0036045 A1    2/2006    Wilson et al.
2009/0023827 A1    1/2009    Lendlein
2010/0100170 A1    4/2010    Tan et al.

FOREIGN PATENT DOCUMENTS

| EP | 2075273 | 7/2009 |
| EP | 2075279 | 7/2009 |
| EP | 2566924 | 11/2011 |
| JP | 44-26118 | 11/1969 |
| JP | 04-146921 | 5/1992 |
| JP | 04-170426 | 6/1992 |
| WO | 2011140246 | 11/2011 |

OTHER PUBLICATIONS

Hearon et al, Post-Polymerization Crosslinked Polyurethane Shape Memory Polymers. J. Appl. Polym. Sci. vol. 121, 2011, pp. 144-153.

Li et al., Shape Memory Effect of Ethylene-Vinyl Accetate Copolymers, J. Appl. Polym. Sci., vol. 71, 1999, pp. 1063-1070.

Nagata et al., "Photocurable Biodegradable Poly(e-caprolactone)/poly(ethylene glycol) Multiblock Copolymers Showing Shape-Memory Properties," Colloid. Polym. Sci. vol. 284, 2006, pp. 380-386.

Nagata et al., "Synthesis and Characterization of Photocrosslinked Poly(E-cprolctone)s Showing Shape-Memory Properties," J. Polym. Sci. Part A: Polym. Chem. vol. 47, 2009, pp. 2422-2433.

Nagata et al., "Synthesis and Properties of Photocurable Biodegradable Multiblock Copolymers Based on Poly(e-caprolactone) and Poly(L-Lactide) Segments." J. Polym. Sci. Part A: Polym. Chem. vol. 43, 2005, pp. 2426-2439.

Wilson et al., "Shape Memory Polymers Based on Uniform Aliphatic Urethane Networks," J. of App. Polym. Sci., vol. 106, 2007, pp. 540-551.

Xu et al., "Systhesis and Shape Memory Effects of Si—O—Si Cross-Linked Hybrid Polyurethanes," Polymer, vol. 47, 2006, pp. 457-465.

The International Searching Authority, Written Opinion of the International Searching Authority and the International Search Report dated Jan. 18, 2012 in International application No. PCT/US2011/035228.

Canadian Office Action for Canadian Application No. 2,798,450 corresponding to U.S. Pat. No. 8,883,871, 5 pages.

European Patent Office, Communication pursuant to Article 94(3) EPC as dated Sep. 7, 2018 in European Patent Application No. 11778281.3, 4 pages.

European Patent Office, Communication pursuant to Article 94(3) EPC as dated Apr. 3, 2019 in European Patent Application No. 11778281.3, six pages.

POST POLYMERIZATION CURE SHAPE MEMORY POLYMERS

CROSS-REFERENCE TO RELATED APPLICATIONS

The present application is a continuation of pending U.S. application Ser. No. 13/892,719, filed May 13, 2013, entitled "Post Polymerization Cure Shape Memory Polymers"; which is a divisional of U.S. application Ser. No. 13/099,146, filed May 2, 2011, entitled "Post Polymerization Cure Shape Memory Polymers", issued as U.S. Pat. No. 8,883,871 on Nov. 11, 2014; which is a non-provisional application of U.S. Provisional Application No. 61/332,039, filed May 6, 2010, entitled "Shape Memory Polymers That Cure Post Polymerization". The entire contents of each of the above applications is specifically incorporated by reference herein.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory and supported by the National Institutes of Health/National Institute of Biomedical Imaging and Bioengineering Grant R01EB000462.

BACKGROUND

Field of Endeavor

This invention relates to chemical polymer compositions, methods of synthesis, and fabrication methods for devices regarding polymers capable of displaying shape memory behavior and which can first be polymerized to a linear or branched polymeric structure, having thermoplastic properties, subsequently processed into a device through processes typical of polymer melts, solutions, and dispersions and then crosslinked to a shape memory thermoset polymer retaining the processed shape.

State of Technology

Shape memory polymers (SMPs) are useful for a diverse set of engineering applications. Because SMPs can retain fixed secondary shapes and recover their original shapes upon heating, their applications are often directed at, but are not limited to, the biomedical industry. For example, an SMP-based suture anchor for graft fixation called Morphix® received FDA approval in February 2009 and has recently been implanted into humans for the first time.[9] An SMP-based interventional microactuator device for treating ischemic stroke[3] is currently being subjected to animal testing at the Texas A&M Institute for Preclinical Studies. SMPs have also received attention for applications outside the medical industry. Raytheon© is currently investigating SMP foams for implementation in thermally-activated wing-deployment systems.

While much progress has been made in the development of new shape memory polymers (SMPs) for engineering applications, difficulties in SMP processing have occurred because many chemically crosslinked SMPs are currently produced in a one-step polymerization of monomers and crosslinking agents. Covalently bonded chemically crosslinked SMPs offer numerous advantages over physically crosslinked SMPs, which include superior cyclic recoverable strains, higher rubbery modulus values, and higher toughness values. These thermoset SMPs are traditionally synthesized either by photo-polymerization or heat-curing of liquid monomers. The chemical reactions that occur during polymerization often result in volume change, which makes complex molding difficult. Thermoset polymers cannot be melted down, so traditional thermoplastic processing methods such as injection molding cannot be used to reshape chemically crosslinked SMPs to fix deformities. Ultimately, current problems in SMP synthesis have limited the mass-production of complex SMP devices. Without the use of injection molding, the mass-production of complex SMP-based products is neither economically feasible nor advantageous.

What is needed, therefore, is a material that can be melt-processed as a thermoplastic and then crosslinked during a secondary step to fix its final shape. This idea of inducing chemical crosslinking into thermoplastic polymer chains is not in itself novel: it dates back to the 19$^{th}$ century, when the process of vulcanization was developed by Charles Goodyear.[16] Late 20$^{th}$ Century projects such as those of Le Roy (Le Roy, et al, Societe Nationale des Poudres et Explosifs (Paris, FR), United States, 1982) and Goyert (Goyert et al, Bayer Aktiengesellschaft, Levertusen DE, United States, 1988) achieved successful crosslinking of thermoplastic polyurethanes and acrylates using irradiation, and Bezuidenhout, et al. U.S. Pat. No. 7,538,163 in 2009 for the development of other chemical mechanisms of post-polymerization urethane crosslinking.

Other have, more recently, investigated post-polymerization crosslinking in thermoplastic polyacrylate systems. However, none of these works have specifically aimed to apply the concept of post-polymerization crosslinking to the synthesis, characterization, and optimization of the thermomechanical properties of shape memory polymers with transition temperatures in the range relevant for biomedical applications by tailoring the chemistries of the polymer systems to maximize susceptibility for post-polymerization crosslinking. Furthermore, to our knowledge no prior work had the objective to place crosslinking sites predominantly uniformly spaced along the polymer chain to provide very sharp actuation transitions.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The object of this invention are chemical compositions, methods of synthesis, and fabrication methods for devices regarding polymers capable of displaying shape memory behavior and which can first be polymerized to a linear or branched polymeric structure, having thermoplastic properties, subsequently processed into a device through processes typical of polymer melts, solutions, and dispersions and then crosslinked to a shape memory thermoset polymer retaining the processed shape. Suitable processes include solution casting, dip coating, thermoforming, compression molding, injection molding, extrusion, and film blowing.

After having been processed into a particular article or shape, these SMPs are able to be crosslinked or cured so that this shape becomes the permanent shape of the article having thermoset properties. Setting of the shape (curing) is possible through a number of processes including but not limited to photo-curing, heat based curing, phase separation (for multiphase/segmented systems), and the like. Specific cure chemistries include but are not limited to: thermally or radiatively initiated radical cure of vinyl groups utilizing a radical initiator, peroxide or sulfur based crosslinking of vinyl groups, thiol addition to vinyl, reaction of isocyanate containing curing agents with hydroxyl, carboxylic acid, amine, or other functionality on the polymer chains; condensation of ester linkages, epoxy chemistry, silane and siloxane coupling reactions, Diels-Alder-type cyclizations, mechanically-induced chemical reactions such as ultrasound-induced electrocyclic ring-openings, the encapsulation of any crosslinking agent inside microcapsules dispersed in the thermoplastic for subsequent activated cure, and the like.

In broad aspect the invention, in one embodiment, is a thermoplastic linear or branched linear polymer having shape memory properties and having crosslinkable sites substantially regularly spaced along the polymer chain which when crosslinked by suitable cure or crosslinking means forms a thermoset polymer having shape memory properties.

In another it is a method of making polymeric articles having shape memory properties comprising forming a thermoplastic linear or branched linear polymer having shape memory properties, processing the polymer into a desired shape, curing the polymer so that a thermoset polymer is formed that has the desired shape as the permanent shape and may be made to take a stable secondary shape through the application of stress or strain at a temperature above its actuation transition, then held at the secondary shape while cooled to a temperature below its transition.

The advantages of the ability to form stable shapes with these unique polymers lends them a multitude of uses including interventional medical devices, consumer goods, toys, insulation, expandable structures for aerospace applications, actuating devices such as components of microdevices, used for bioanalytical instrumentation and sensors. These polymers also have the potential for use in shape memory polymer foams with improved toughness.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1:
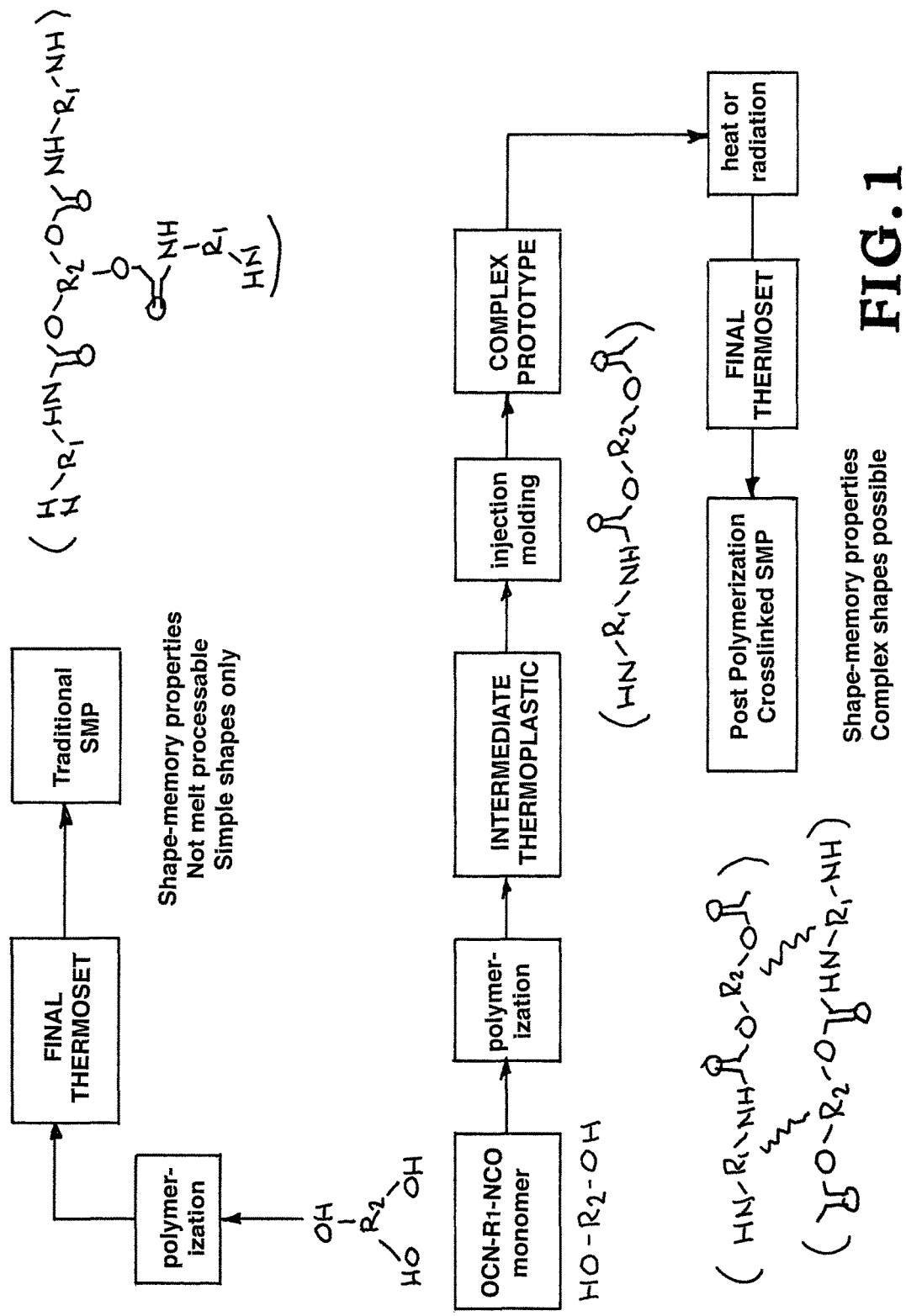
FIG. 1 graphical representation showing comparison of synthesis and processing of a traditional shape memory polymer and a post-condensation cured shape memory polymer of this invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

This invention, in broad aspect, is both shape memory thermoplastic polymer compositions that can be shaped then cured into a permanent thermoset shape memory polymer and the method of making such polymer compositions.

A comparison of traditional chemically cured (crosslinked) SMPs and the novel SMP compositions made according to this invention is shown in FIG. 1. Both thermally activated and radiation-induced crosslinking methods are disclosed. As used herein the terms cured and crosslinked are used interchangeably.

The compositions of the invention are achieved by producing a thermoplastic linear or branched linear polymer having shape memory properties and having curable (crosslinkable) sites substantially regularly spaced along the polymer chain which when crosslinked by suitable cure or crosslinking means forms a thermoset polymer also having shape memory properties.

This invention provides chemical compositions, methods of synthesis, and fabrication methods for devices regarding polymers capable of displaying shape memory behavior and which can first be polymerized to a linear or branched polymeric structure and then subsequently processed into a desired shape through processes typical of polymer melts, solutions, and dispersions. Such processes include but are not limited to solution casting, dip coating, thermoforming, compression molding, injection molding, extrusion, and film blowing.

After having been processed into a particular article or shape, these SMPs are able to be crosslinked or cured so that this shape becomes the permanent shape of the article. Setting of the shape is possible through a number of processes including but not limited to photo-curing, heat based curing and phase separation (for multiphase/segmented systems). Specific cure chemistries include but are not limited to: thermally or radiatively initiated radical cure of vinyl groups utilizing a radical initiator, peroxide or sulfur based crosslinking of vinyl groups, thiol addition to vinyl, reaction of isocyanate containing curing agents with hydroxyl, carboxylic acid, amine, or other functionality on the polymer chains; condensation of ester linkages, epoxy chemistry and silane and siloxane coupling reactions, Diels-Alder-type cyclizations, mechanically-induced chemical reactions such as ultrasound-induced electrocyclic ring-openings, the encapsulation of any crosslinking agent inside microcapsules dispersed in the thermoplastic for subsequent activated cure, and the like.

The ability of these materials to be crosslinked after initial polymerization may be due to the presence of a second type of functional group on the original monomer, or it may be due to inherent residual reactivity in the system that can be utilized through the application of energy such as radiation.

A key aspect of these materials is that they are initially formed into relatively high molecular weight chains prior to curing, providing for fabrication with typical polymer melt or solution processing methods. This also allows for simultaneously recovery of very high strains as well as a very high percent recovery of strain.

Another key aspect of these new crosslinkable SMPs is an improvement in both the extensibility and toughness of the material versus those thermoset SMPs formed directly from monomers, dimers, and other low molecular weight precursors.

Yet, another key aspect of these new crosslinkable SMPs is that the placement of crosslink sites along the chain can be very regular (e.g. constant Mw between crosslinks), providing for very sharp thermal transitions for actuation.

There are a multitude of uses for the materials described in this invention including interventional medical devices, consumer goods, toys, insulation, expandable structures for aerospace applications, actuating devices such as components of microdevices, used for bioanalytical instrumentation and sensors. These polymers have the potential for use in shape memory polymer foams with improved toughness.

The compositions and methods of embodiments of this invention are principally explained in this disclosure by polyurethane compositions but the invention includes, as well, polymer systems including condensation polymer compositions that include polyesters, polyamides (e.g. Nylons), polyaramides, polyureas, polycarbonates, polyethers, epoxies and vinyl polymer systems including homopolymers (e.g. hydroxyethylmethacrylate) and copolymers (e.g. alternating copolymers).

One set of polymer compositions of this invention will be those wherein the polymer backbone or polymer side chain contains, in the following order: an electron withdrawing group, a methylene or methyne carbon in the alpha position to the electron withdrawing group, and an unsaturated carbon-carbon double bond in the beta position to the electron withdrawing group. For radiation-induced curing, the double bond provides resonance stabilization for radiation-induced radicals formed from hydrogen extrapolation at the alpha methylene or methyne carbon, enhances the polymer's susceptibility to crosslinking via radiation-induced radical graft polymerization, and allows crosslink sites to be incorporated into the polymer chain at uniform intervals.

Another set of suitable polymer compositions of this invention will be those wherein the polymer backbone or polymer side chain contains an unsaturated carbon-carbon double bond. This double bond should be thermodynamically stable enough to remain unreactive during the initial thermoplastic polymerization. For thermal cure, the double bonds act as a crosslinking site for crosslinking via thermally-activated radical chain polymerization.

In another set of suitable polymer composition the crosslinkable sites are alkoxysilanes or acetoxysilane based. The alkoxy- or acetoxy-silane groups can be incorporated into the SMP backbone in multiple ways. First, they can be incorporated using a diisocyanato-dialkoxysilane, where the isocyanate groups react with the normal diol and become part of the chain. The remaining one or two alkoxy (or acetoxy) groups on the silicone atom then are available for a moisture cure mechanism. In the moisture cure, the alkoxysilane/acetoxysilane groups react with water to form silanols, then two silanols from separate chains condense to form a crosslink and kick off water.

A fourth means is to have a tri (alkoxy or acetoxy) hydrogensilane molecule react via Pt catalyzed addition with vinyl groups already on the linear polymer to create mono-, di-, or tri-(alkoxy or acetoxy) silane side groups. This would then also be moisture curable according to the reactions above.

Polyurethane Systems

Specific monomers which can be used for urethanes with post-polymerization olefinic (carbon-carbon double bond) based crosslinking include 1,6-diisocyanatohexane (HDI), trimethylhexamethylene diisocyanate, dicyclohexylmethane 4,4' diisocyanate, trans-1,4-cyclohexylene diisocyanate, 1,3-Bis(isocyanatomethyl)cyclohexane, 1,5-Diisocyanato-2-methylpentane, 1,7-diisocyanatoheptane, 1,8-Diisocyanatooctane, 2-butene-1,4-diol, 1,4-butanediol, 1,6-hexanediol, 1,8-octanediol, 1,10-decanediol, 1,6-hexanediylbis[oxy(2-hydroxy-3,1-propanediyl)]bisacrylate, bisphenol A glycerolate dimethacrylate, 3,4-Dihydroxy-1-butene, 7-Octene-1,2-diol, pentaerythritol triacrylate, diethylene glycol, diethanolamine, hydroquinone bis(2-hydroxyethyl) ether, triethylene glycol, 1-(benzyloxymethyl) triethylene glycol and 2,2'-ethyliminodiethanol. To increase radiation-induced crosslink density, the thermoplastics can be solution blended in THF or other solvents with polyfunctional (meth) acrylate sensitizers such as pentaerythritol triacrylate, tris[2-(acryloyloxy)ethyl]isocyanurate, triallyl isocyanurate, diurethane dimethacrylate, 1,6-hexanediol diacrylate, or other custom-synthesized sensitizers, but radiation crosslinking can still be achieved without the use of sensitizers.

Example 1

Exemplary of compositions of this invention, linear, olefinic urethane polymers from 2-butene-1,4-diol, other saturated diols, and various aliphatic diisocyanates including trimethylhexamethylene diisocyanate (TMHDI), and dicyclohexylmethane 4,4'-diisocyanate (DCHMDI) were synthesized. The chemical structures of these monomers are illustrated in Table 1. Monomers were selected which were predicted to produce polymers with glass transitions in the range of 20-80° C. Urethane chemistry was selected because of the high relative thermodynamic stability of the vinyl group in 2-butene-1,4-diol relative to the stability of the isocyanate/diol reaction and in order to incorporate crosslink sites along the chains at substantiality uniform intervals. This unsaturated (double bond) site was expected to remain unreactive during the initial polymerization and thus be preserved in the polymer backbone. These compositions were then cured by crosslinking at or near the unsaturated sites as described below.

These thermoplastics were melt-processed into desired geometries and thermally crosslinked at 200-225° C. or radiation crosslinked at 50 kGy. The SMPs were characterized by sol/gel analysis, differential scanning calorimetry (DSC), dynamic mechanical analysis (DMA), tensile testing, and qualitative shape-recovery analysis. Sol/gel analysis and DMA results provided concrete evidence of chemical crosslinking, and further characterization revealed that the urethanes had outstanding mechanical properties. Key properties include tailorable glass transitions between 25 and 80° C., tailorable rubbery moduli between 0.2 and 4.1 MPa, recoverable strains approaching 100%, failure strains of over 500% at $T_g$, and qualitative shape-recovery times of less than 12 seconds at body temperature (37° C.). Because of its outstanding thermo-mechanical properties, one polyurethane was selected for implementation in the design of a complex medical device. These new post-polymerization crosslinkable urethane SMPs constitute an industrially relevant class of highly processable shape memory materials.

For some embodiments, target mechanical properties included a glass transition temperature ($T_g$) below body temperature (37° C.), a sharp glass transition range, a high rubbery modulus, a high strain to failure at $T_g$, a high recoverable strain capacity, a high recovery stress, and a fast shape recovery time at body temperature. Dynamic Mechanical Analysis (DMA) and solvent extraction experiments were carried out in order to confirm the occurrence of post-polymerization crosslinking and to characterize this

TABLE 1

Compositions of Series 1, 1R, 1H, 2, 2R, 3, and 3R samples.

| Series 1, 1H, 1 R | DCHMDI | TMHDI | Un-crosslinked | Heat Crosslinked | Radiation Crosslinked | Chemical Structures |
|---|---|---|---|---|---|---|
| 50% 2-butene-1,4-diol | 0% | 50% | 1a | 1H-a | 1R-a | Diols |
| | 5% | 45% | 1b | 1H-b | 1R-b | 2-butene-1,4-diol |
| | 10% | 40% | 1c | 1H-c | 1R-c | |
| | 20% | 30% | 1d | 1H-d | 1R-d | |
| | 30% | 20% | 1e | 1H-e | 1R-e | 1,4 butanediol |
| 50% 1,4 buta-nediol Series 2, 2R | 0% 1,8-octanediol | 50% 2-butene-1,4-diol | 1f | — | 1R-f | 1,6 hexanediol |
| 50% TMDHI | 5% | 45% | 2a | — | 2R-a | 1,8 octanediol |
| | 15% | 35% | 2b | — | 2R-b | |
| | 20% | 30% | 2c | — | 2R-c | |
| | 25% | 25% | 2d | — | 2R-d | Diisocyanates |
| Series 3, 3R | 1,6-hexanediol | 2-butene-1,4-diol | | | | TMHDI |
| 50% TMHDI | 10% | 40% | 3a | — | 3R-a | |
| | 15% | 35% | 3b | — | 3R-b | DCHMDI |
| | 20% | 30% | 3c | — | 3R-c | |
| | 25% | 25% | 3d | — | 3R-d | | novel crosslinking mechanism. Further DMA tests, as well as DSC, tensile testing, and qualitative shape-recovery analysis experiments were run to evaluate the biomedical relevance of the new urethane materials.

Experimental

Materials and Thermoplastic Sample Preparation

Thermoplastic urethane samples were synthesized from monomers which could possibly result in post-polymerization crosslinking. Three distinct series of materials were synthesized. Series 1a-1e was prepared from 2-butene-1,4-diol (95%) and varying ratios of TMHDI, (97%, TCI America), and DCHMDI, (97%, TCI America). Series 1a-1e consisted of 0%, 5%, 10%, 20%, and 30% DCHMDI (overall molar percent). Increasing DCHMDI composition was predicted to raise the $T_g$. Sample 1f was prepared from TMHDI and 1,4-butanediol (98%) in order to evaluate the effect of the double bond in 2-butene-1,4-diol on crosslinking. Series 2 was prepared from TMHDI and varying ratios of 2-butene-1,4-diol and 1,8-octanediol (98%). Series 2a-2d consisted of 5%, 15%, 20%, and 25% 1,8-octanediol (overall molar percent). Series 3 was prepared from TMHDI and varying ratios of 2-butene-1,4-diol and 1,6-hexanediol (98%). Series 3a-3d consisted 10%, 15%, 20%, and 25% 1,6-hexanediol (overall molar percent). The saturated diols were added to lower the $T_g$. The chemical compositions of all samples are listed in Table 1.

All chemicals, unless otherwise stated, were purchased from Sigma-Aldrich and used as received. All urethanes were prepared in 50% solution in tetrahydrofuran (THF; anhydrous, >99.9%) using stoichiometric diisocyante/diol ratios. The isocyanate monomers were stored under dry nitrogen until use to prevent moisture absorption. The stoichiometric diol-diisocyanate solutions were prepared in glass vials. The vials were loosely sealed (to prevent pressure buildup) and were placed in a Thermoline furnace at 60° C. under a dry nitrogen atmosphere for 24 hours. The polymer solutions were then poured into polypropylene dishes and placed into a Yamato Benchtop Vacuum Drying Oven at 80° C. at 1 torr for 48-144 hours.

After drying under vacuum, the thermoplastic samples were mostly solvent free. The samples were then removed from the polypropylene dishes and pressed to a thickness of 1 mm using a Carver hot press at 150° C. for 20-30 seconds. The samples were pressed between Teflon-coated stainless steel plates using a 1 mm-thick square stainless steel spacer.

Preparation of Thermally and Radiation Crosslinked Samples

After the thermoplastic samples were synthesized, they were subjected to heat or radiation in an attempt to induce chemical crosslinking. The samples prepared for thermal crosslinking were put back on the Teflon-coated stainless steel plates and placed in the Yamato vacuum oven at 200° C. at 1 torr until the onset of crosslinking was visible. The onset of crosslinking was marked by the failure of bubbles in the samples to evaporate out. After the onset of crosslinking, vacuum was released, and the samples were left under nitrogen at 200° C. for 10 hours. Heat crosslinking only yielded testable, thin-film samples for Series 1. The 1 mm-thick films were laser-cut into DMA and dog bone samples using a Universal Laser Systems $CO_2$ VeraLaser machine. The heat-crosslinked Series 1 samples were then labeled 1H-a to 1H-e. It is important to note that no thermal initiator was used to induce thermal crosslinking.

Sample 1a was exposed to different temperatures for varying amounts of time in order to evaluate the effects of temperature and heat exposure time on crosslinking. In Series 4, thermoplastic 1a samples (0% DCHMDI) were placed in the oven at 200° C. for 1, 2, 3, 4, 6, 8, 10, and 12 hours. Samples were labeled Series 4a, 4b, etc. Another series of thermally crosslinked 0% DCHMDI samples, Series 5, was made from heat exposure 225° C. for 2.5, 4, 6, and 8 hours and was labeled Series 5a, 5a, etc. After being pressed to 1 mm-thick films, all thermoplastic samples in Series 1-3 were exposed to electron beam radiation at 50 kGy. Irradiated samples were labeled 1R-a, 2R-a, etc.

Characterization by Sol/Gel Analysis

In order to determine if the heated and irradiated samples were crosslinked, sol/gel analysis experiments were run to determine gel fraction. Sol/gel analysis experiments were run on all samples in Series 1H and 1R, as well as on select samples in Series 2R and 3R. Since the thermoplastic urethanes were synthesized in 50% THF solution and remained in solution after polymerization, THF was chosen as the solvent for the sol/gel analysis experiments. 0.5 g samples were massed, put in 50:1 THF mixtures in 40 mL glass vials, and heated at 50° C. on a J-Kem Scientific Max 2000 reaction block at 150 rpm for 24 hours. The swollen samples were then vacuum-dried at 100° C. at 1 torr for 24 hours, until no further mass change from solvent evaporation was measurable.

Figure 2:
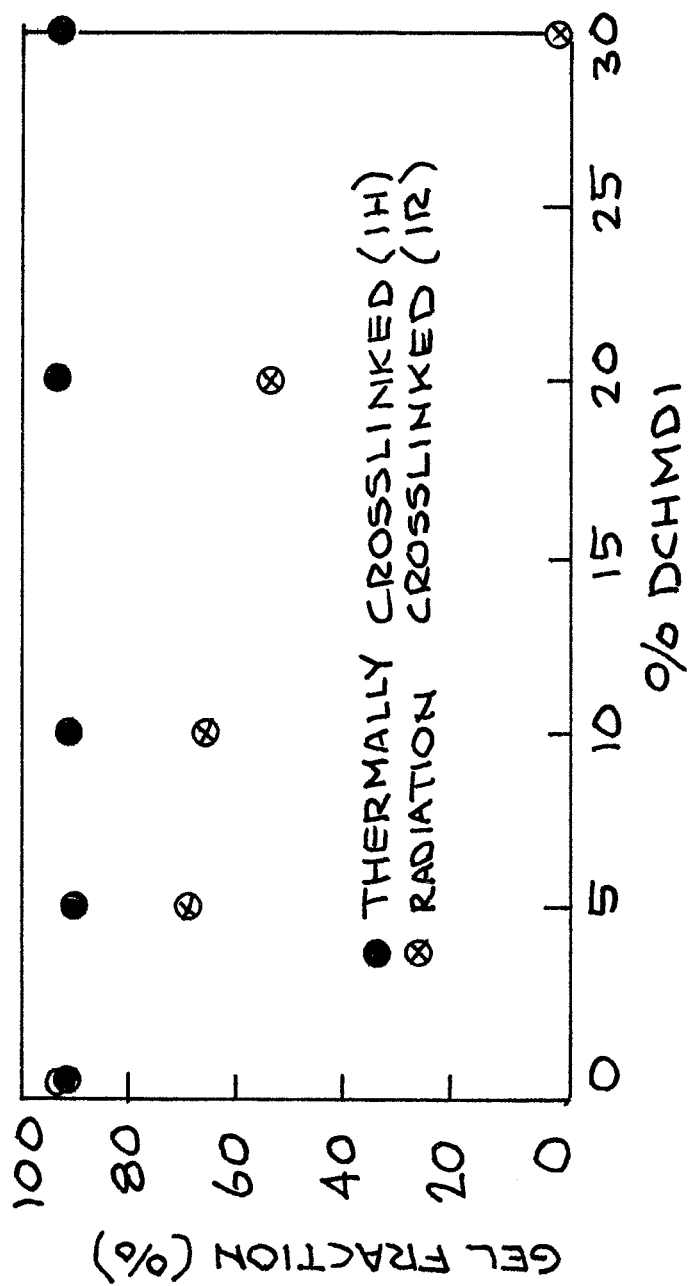
FIG. 2 is a plot showing gel fraction versus % DCHMDI for samples of an embodiment of the invention.
Figure 3:
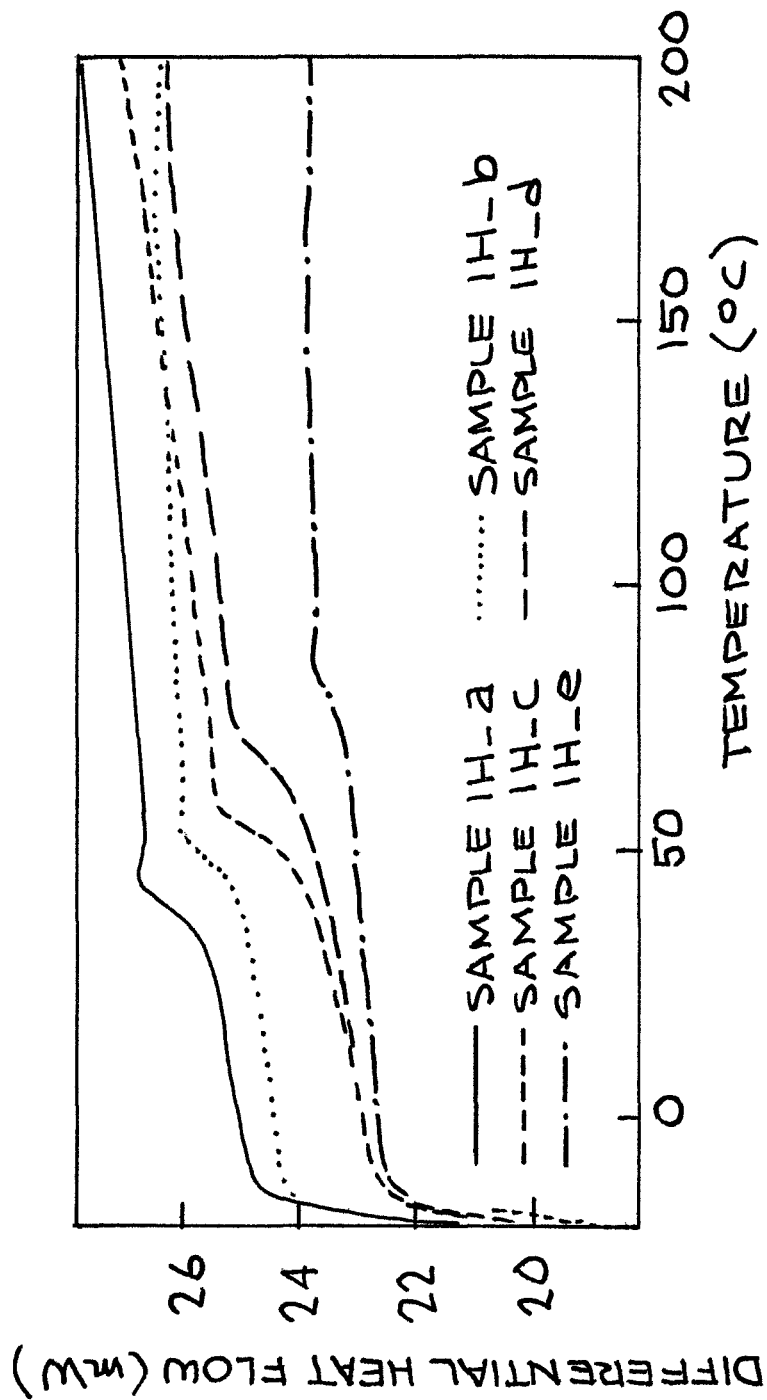
FIG. 3 is a plot showing DSC results for Series 1 thermally crosslinked samples.

Sol/gel analysis and DMA results showed that several of the new urethane systems were crosslinked. Mechanical characterization revealed that the materials had mechanical properties highly suitable for biomedical applications. While the 1H thermally crosslinked urethanes all had gel fractions above 90%, the 1R radiation crosslinked urethanes showed a significant decrease in gel fraction as DCHMDI composition was increased from 0-30%. A plot of chemical composition versus percent gel fraction for Series 1H and 1R is provided in FIG. 2. Sol/gel analysis data for all samples is provided in Table 2.

TABLE 2

| Sol/gel analysis results for all samples tested | | | | | |
| --- | --- | --- | --- | --- | --- |
| Sample | Gel Fr. | Sample | Gel Fr. | Sample | Gel Fr. |
| 1H_a | 91.8% | 1R_a | 93.2% | 2R_b | 80.2% |
| 1H_b | 90.5% | 1R_b | 68.9% | 2R_d | 95.8% |
| 1H_c | 91.3% | 1R_c | 66.1% | 3R_c | 72.2% |
| 1H_d | 93.9% | 1R_d | 54.0% | 1R_f | 78.8%. |
| 1H_e | 93.3% | 1R_e | 0.0% | | |

Since the butene-1,4-diol was only 95% pure, and since the urethane samples may have absorbed moisture from the atmosphere before solvent evaporation, the evaporation of water and other impurities may have made the gel fractions appear even lower than they actually were. Thus, the gel fraction results from the thermally crosslinked urethanes (and any other gel fractions above 90%) are strong evidence of chemical crosslinking.

Characterization by Dynamic Mechanical Analysis

DMA experiments were run on all samples subjected to heating or irradiation using a TA Instruments DMA Q800 Series dynamic mechanical analyzer controlled by a PC running Q Series software. Test samples were cut from 1 mm-thick films to 5 mm×12 rectangles.

In order to determine if samples were crosslinked, and also to determine storage modulus and $T_g$, the samples were subjected to DMA isostrain tests. In the "DMA Multifrequency-Strain" mode, frequency was set to 1.0 Hz, strain was set to 0.1%, preload force was set to 0.01 N, and forcetrack was set to 125%. The temperature range was 0-200° C. with a ramp rate of 5° C./min. If sample slippage occurred during the glass transition, the ramp rate was slowed to 2° C./min over the range of T=$T_g$±10° C., and the sample was re-run. Plots of storage modulus and tan delta versus temperature were recorded using the QSeries software. $T_g$ was determined from the peak of the tan delta curves.

Figure 4:
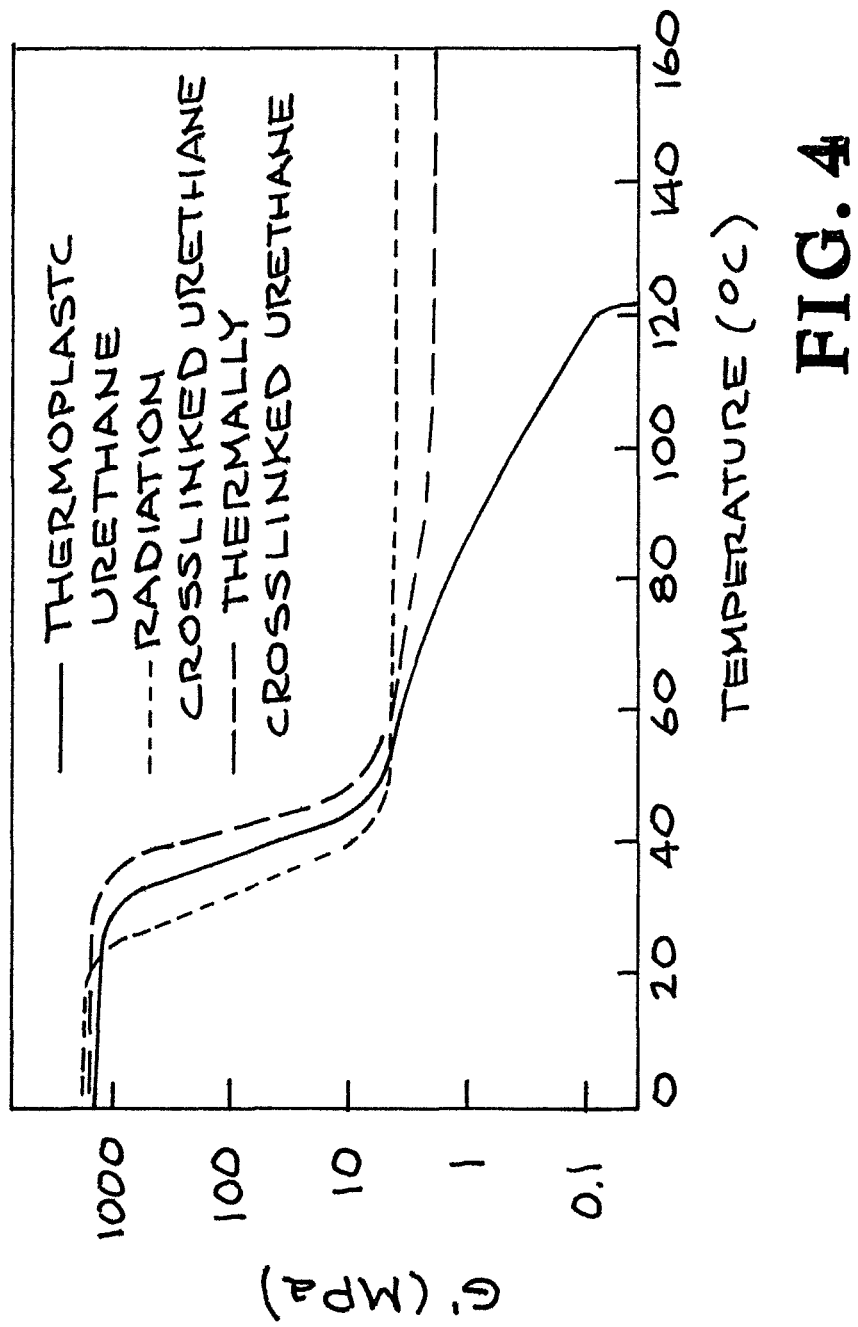
FIG. 4 is a plot showing Storage modulus for thermoplastic, radiation crosslinked, and thermally crosslinked in compositions of this invention.

DMA results on all heated and certain irradiated samples are shown in FIGS. 3, 4, 5, 6 and 7. All samples showed curves characteristic of amorphous polymers, i.e., a glassy region at low temperatures, a glass transition at higher temperatures, and a rubbery plateau. FIG. 4 compares the DMA curves for thermoplastic, radiation crosslinked, and thermally crosslinked 1a samples. These plots show significant changes in the rubbery modulus values before and after heating and irradiation. While the thermoplastic sample 1a melts around 120° C., the irradiated and heated samples do not flow at temperatures well above $T_g$; this behavior indicates that significant crosslinking has occurred.

Figure 5:
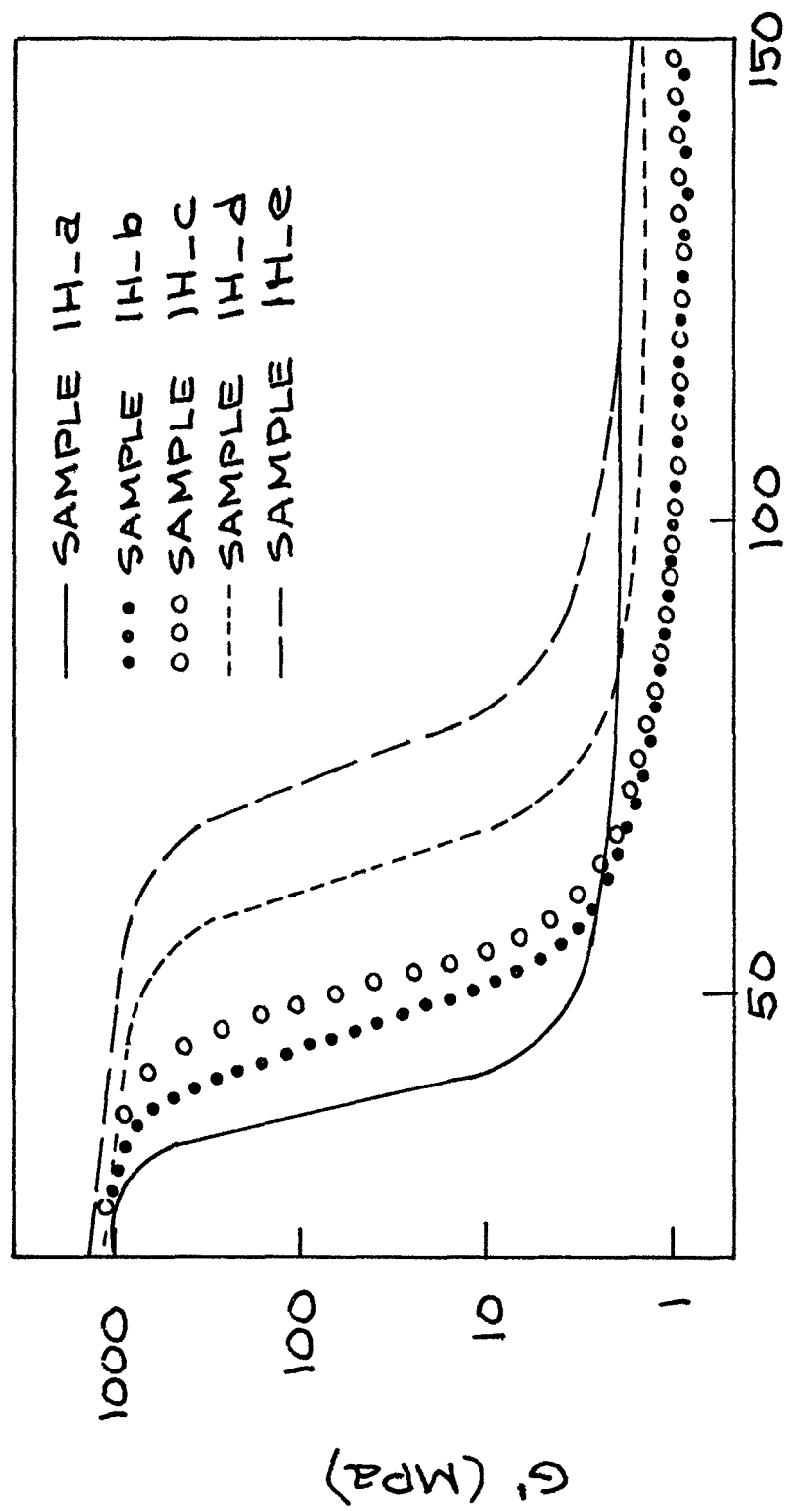
FIG. 5 is a plot of DMA storage modulus (G') for thermally crosslinked samples of the invention.
Figure 6:
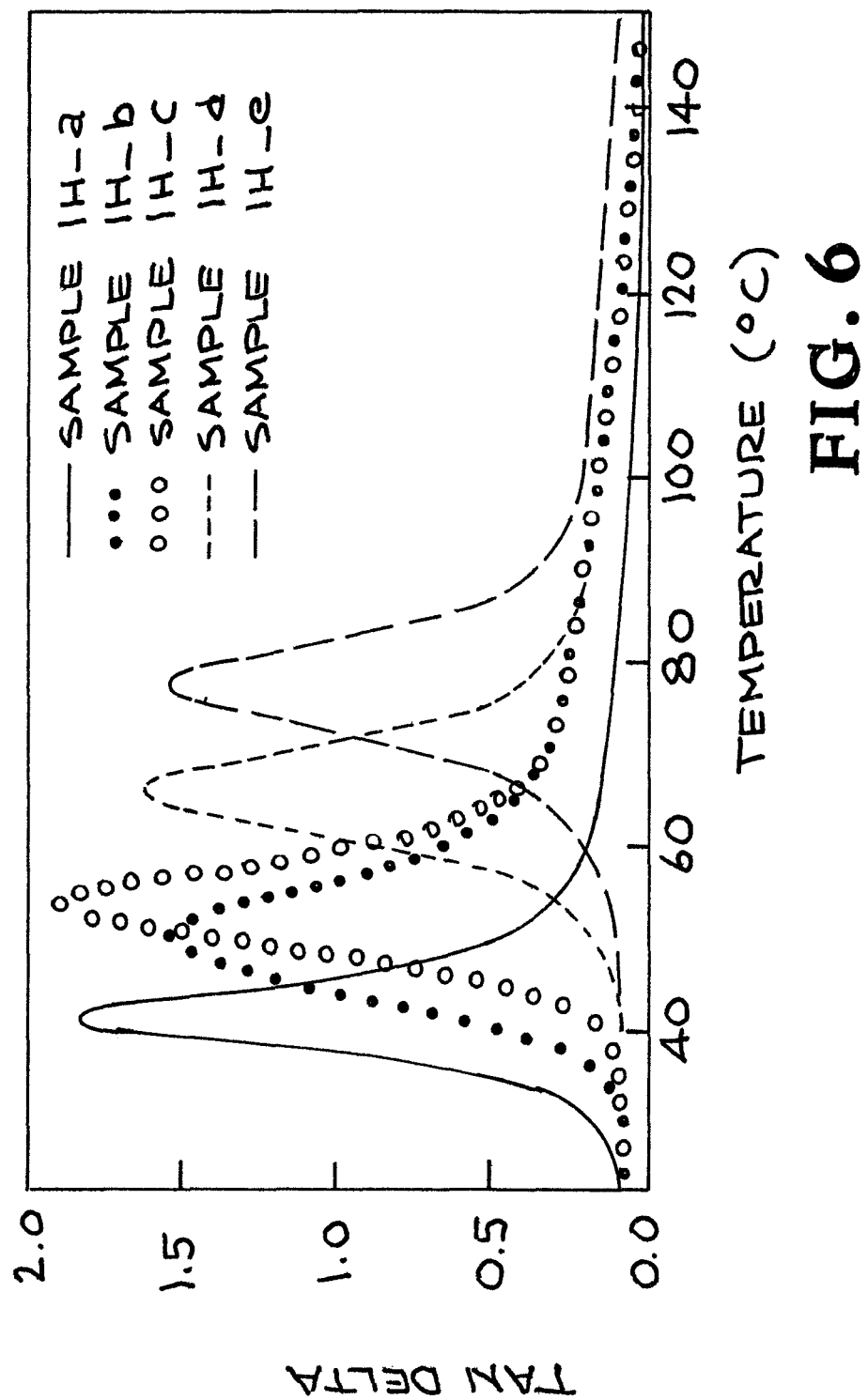
FIG. 6 is Tan delta plots for thermally crosslinked samples of compositions of this invention.
Figure 7:
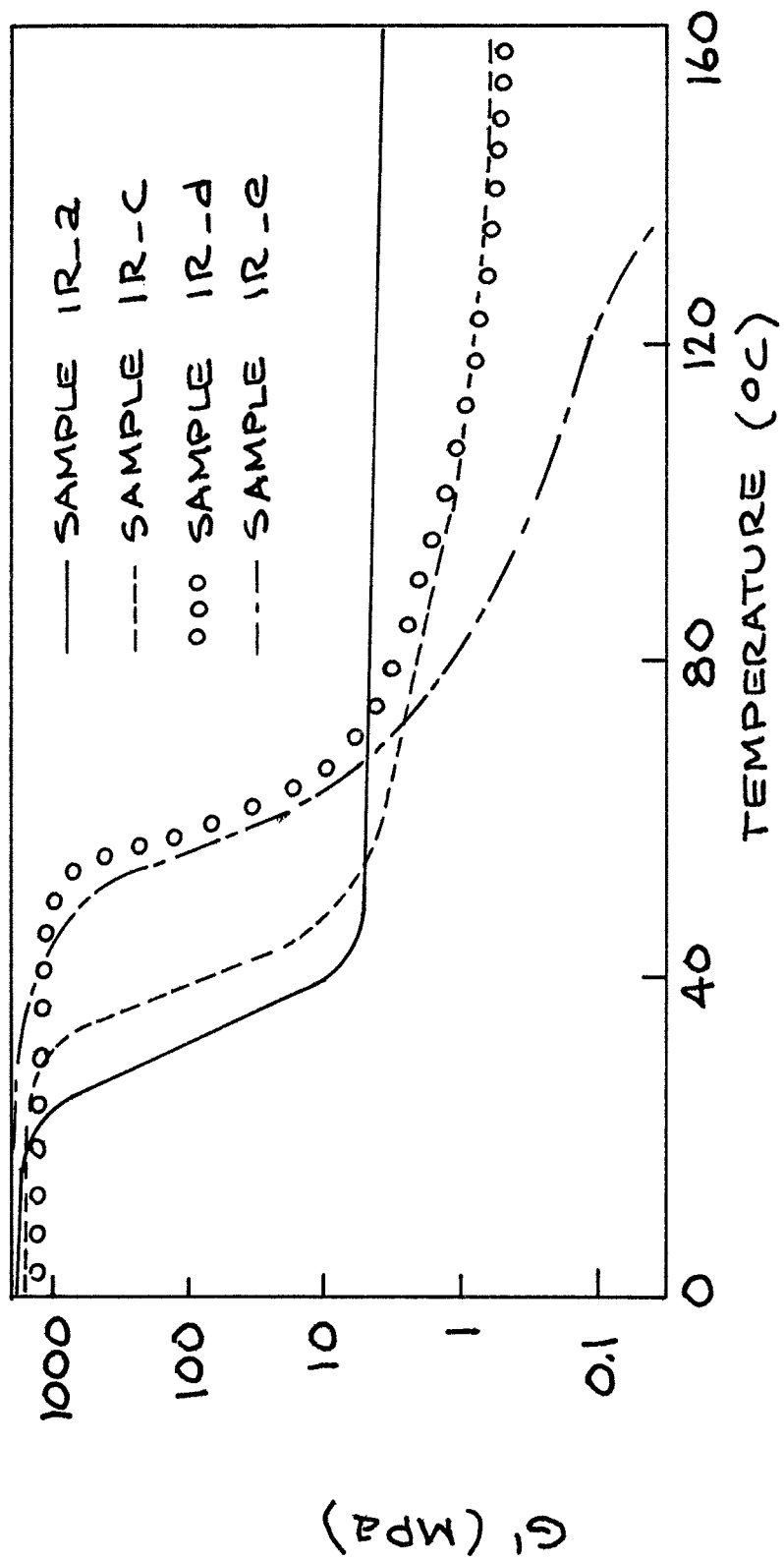
FIG. 7 is a plot showing the effect of increasing DCHMDI composition on radiation crosslinking of select compositions of this invention.

FIG. 5, a comparison of storage modulus plots for all thermally crosslinked samples, shows the polymers to have glass transitions from 32 to 80° C. and rubbery moduli from 1.9 to 4.0 MPa. The rubbery moduli for the samples remain constant and even increase slightly with increasing temperature, thus indicating ideal elastomeric behavior. In FIG. 6, the tan deltas approach zero both above and below $T_g$. These figures show no additional transitions, such as those caused by crystalline melting. The sharpness of the glass transition, as seen in the tan delta curves, is evidence of a homogenous network structure. This homogeneity arises from the base polymer's being an alternating copolymer and is indicative that there is a narrow dispersion of molecular weights between crosslink sites.) When coupled with the high gel fraction data listed in Table 2 and displayed in FIG. 2, the DMA results in FIGS. 3, 4, 5, 6 and 7 provide decisive evidence that the samples in Series 1H are chemically crosslinked.

Cyclic Free Strain Recovery Tests

Cyclic free strain recovery experiments were run in tension to evaluate the difference in percent recoverable strain between the thermoplastic and crosslinked samples. In the "DMA-Strain Rate" mode, frequency was set to 1.0 Hz, strain was set to 1.5%, and preload force was set to 0.01 N. The samples were heated to 35° C. above $T_g$ (tan delta peak), strained to 50%, and were then rapidly quenched to 0° C. at −10° C./min while maintaining the 50% strain. Then, for free-strain recovery, the applied force was set to ON, and the temperature was ramped from 0° C. to 140° C. at 5° C./min. For cyclic testing, the samples were cooled back to $T_g$+35° C. at −10° C./min, strained again to 50%, and the previous procedures were repeated. Percent strain recovered as a function of temperature and time was recorded using the QSeries software. For thermoplastic samples, 2-cycle experiments were run, and for crosslinked samples, 3-cycle experiments were run.

Figure 8A:
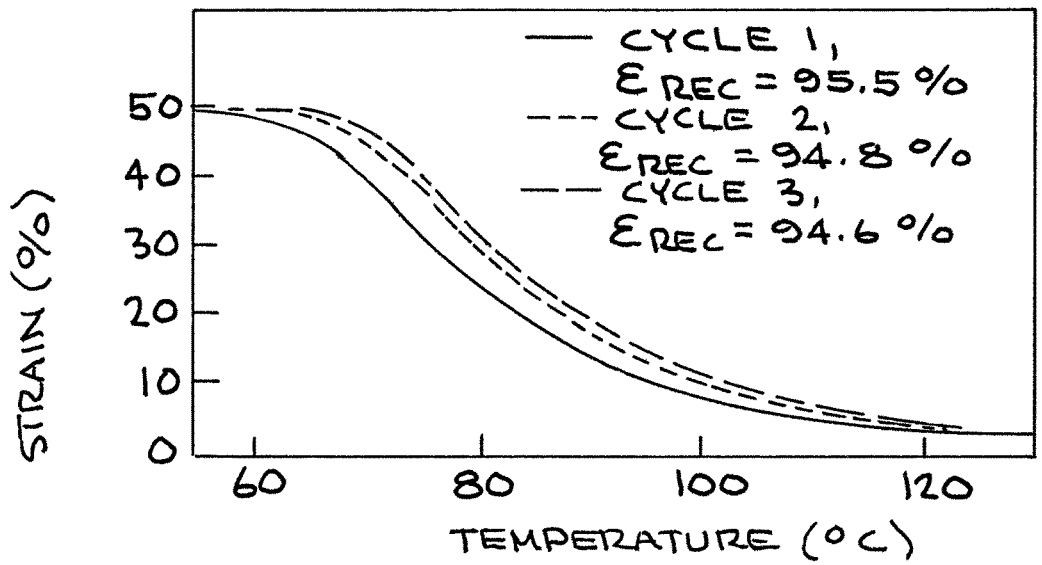
FIGS. 8a and 8b are plots showing percent recovered strain versus temperature for two compositions of this invention.
Figure 8B:
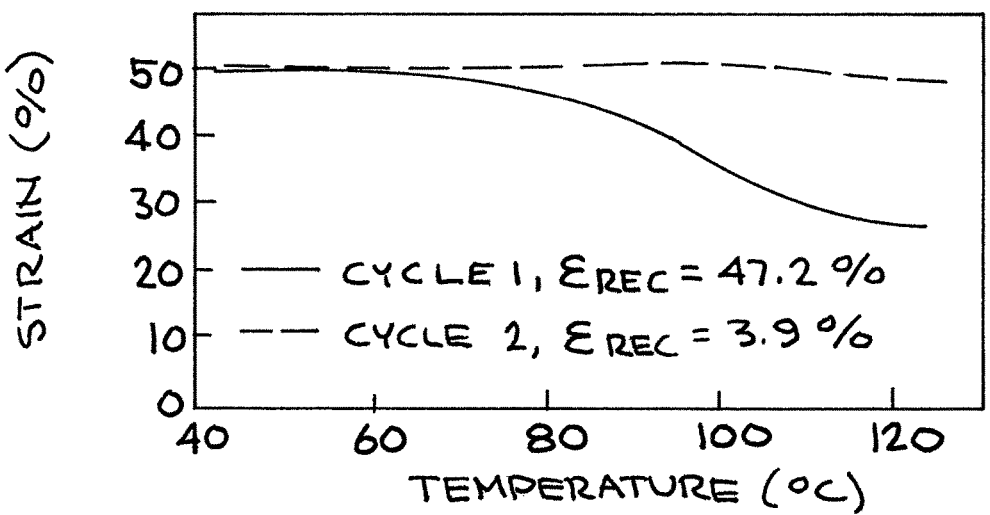

Percent recoverable strain was determined during free recovery over repeated cycles. FIG. 8 compares the free strain recovery for thermoplastic and thermally crosslinked 20% DCHMDI samples. After the first cycle, the thermally crosslinked sample recovered 95.5% strain. After the second and third cycles, the sample recovered 94.8% and 94.6% strain, respectively. The thermoplastic samples did not demonstrate high percent recoverable strain. After cycle 1, percent recoverable strain was 46.1%, and after cycle 2, it was 3.1%. Cyclic free strain recovery plots are shown for thermally crosslinked and thermoplastic 20% DCHMDI samples in FIGS. 8 (a) and (b), respectively.

Constrained Recovery Tests

In order to determine the maximum recovery stress of the samples in the new urethane system and evaluate the effect of crosslinking on recovery stress, constrained recovery tests were run on samples 1a and 1R-a. Sample 1R-a was chosen because it had the highest overall rubbery modulus value at T=$T_g$+20° C. In the "DMA-Strain Rate" mode, frequency was set to 1.0 Hz, strain was set to 1.0%, and preload force was set to 0.01 N. The samples were heated to 75° C., strained to 50%, and were then rapidly quenched to 0° C. at −10° C./min while maintaining the 50% strain. Finally, the samples were heated from 0° C. to 150° C. at 5° C./min without removing the applied stress. Recovery stress was recorded as a function of temperature.

Figure 11:
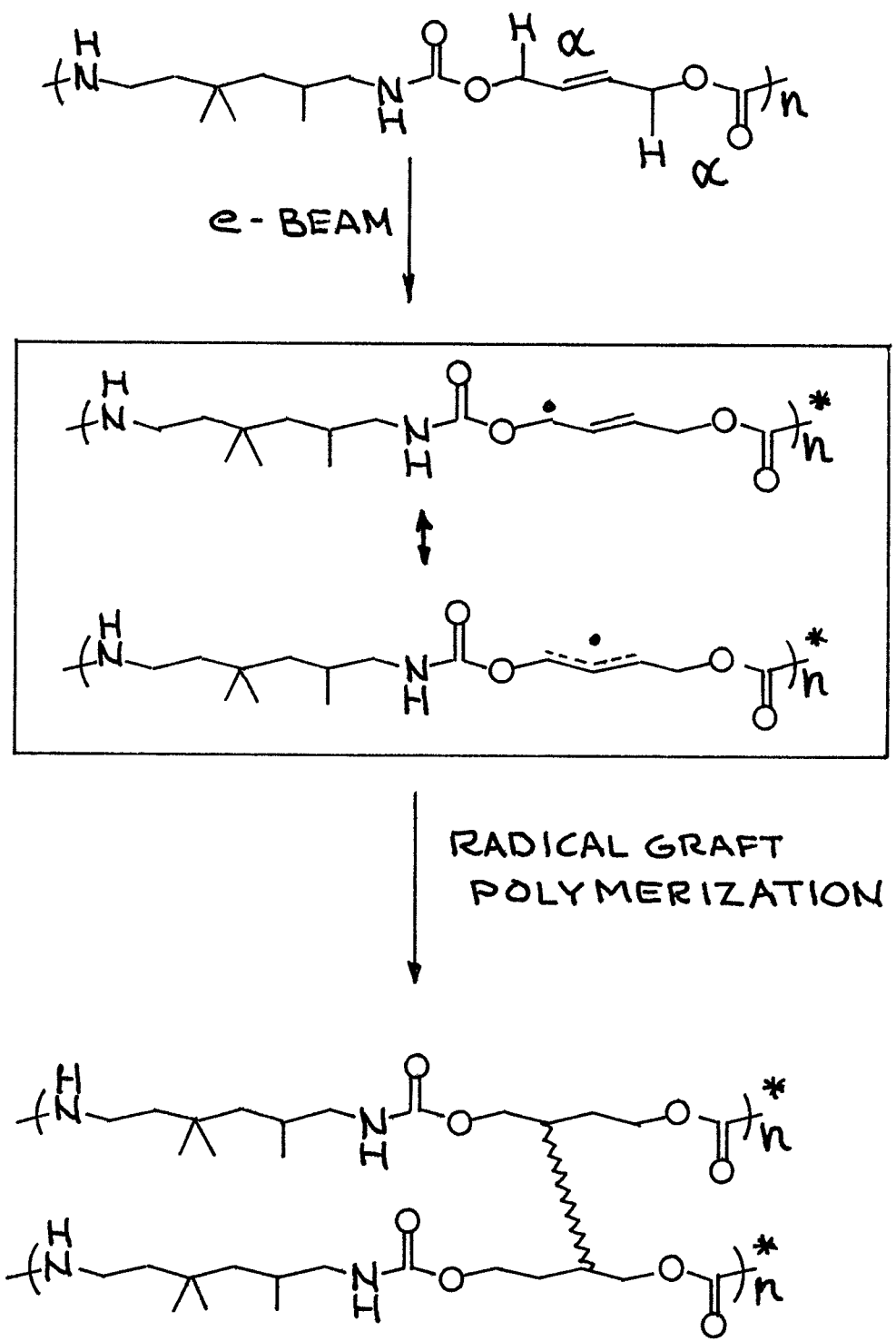
FIG. 11 is a graphical representation of a proposed chemical mechanism for the radiation crosslinking of samples containing 2-butene-1,4-diol.

The radiation crosslinked 0% DCHMDI sample was subjected to constrained recovery testing because it had the highest rubbery modulus (4.2 MPa) at T=$T_g$+20° C. of any sample characterized in this work. FIG. 11 compares the constrained recovery results for the thermoplastic and radiation crosslinked samples. At body temperature (37° C.), the recovery stress of the crosslinked sample was 0.66 MPa (95 PSI), and its maximum recovery stress was 0.83 MPa (121 PSI). The thermoplastic sample did not exhibit a recovery stress.

Characterization by Tensile Testing

To determine toughness values, ultimate tensile strengths, and failure strains, strain to failure experiments were carried out on Series 1H. Dog bone samples were cut using a $CO_2$ laser according to ASTM Standard D-412. Strain to failure experiments were run three times on each sample using 100N load cell in a TA Instruments Insight 2® universal tensile tester. Experiments were run at $T_g$, which was determined from the peak of the tan deltas from DMA plots.

Strain to failure showed the new urethanes to have high toughness. All three samples strained to over 500% elongation, while still exhibiting significant strain hardening. Toughness was calculated to be 50.2 MJ/m$^3$.

Characterization by Qualitative Shape Recovery Analysis

Recovery time was measured using qualitative shape recovery analysis. The qualitative recovery analysis was performed on Samples 1R-a and 1H-a, which had sharper glass transition curves than any other materials with $T_g$'s within 5° C. of body temperature. In these tests, flat 4×60×1 mm samples were coiled into helical shapes at 70° C. The deformed samples were then quenched by immersion in an ice water bath to maintain the helical shapes. The samples were then placed in 37° C. water, and the shape recovery was recorded using a high-definition digital video camera.

Figure 10:
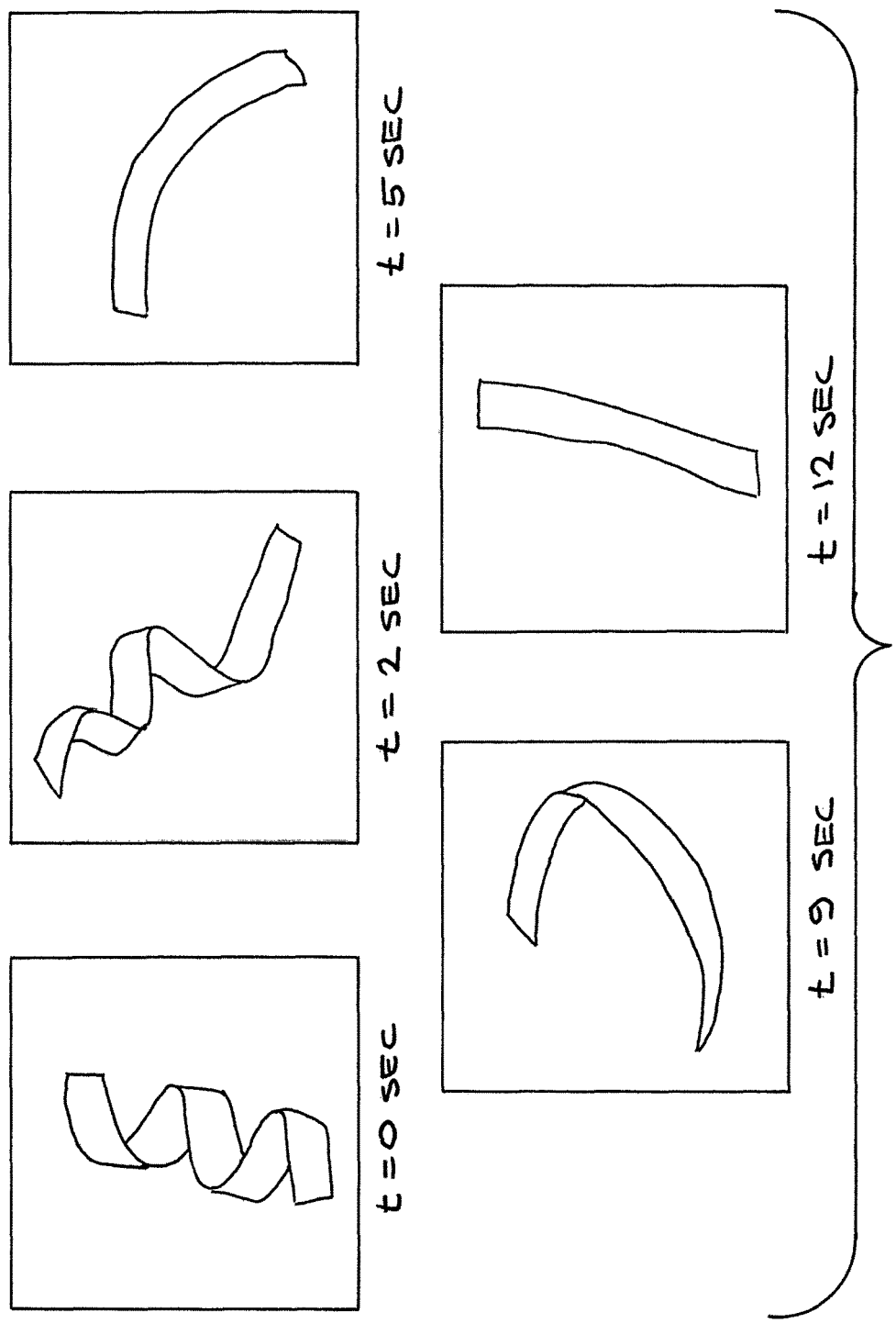
FIG. 10 is a picture of images of the shape recovery at 37° C. of a composition of this invention over a 12-second time period.

The coiled samples both achieved full shape recovery in 12 seconds at body temperature. Images of Sample 1R-a at different points in its 12-second recovery period are provided in FIG. 12 (1H-a was tested, but is not pictured). Each sample was deformed into the coiled shape shown at time 0 in FIG. 10 and put in water at 37° C.

Conclusions from the Tests in Example 1.

Figure 9:
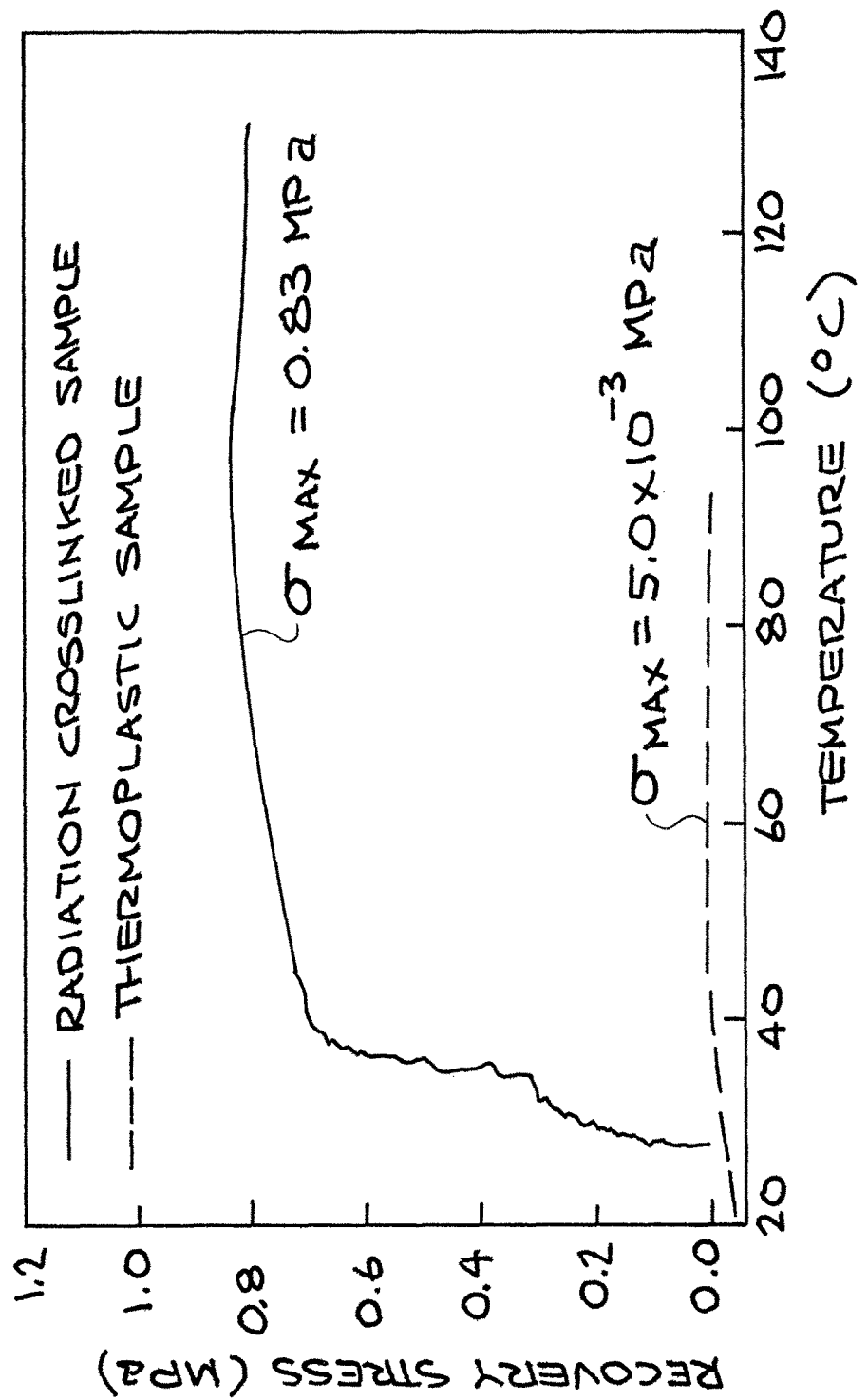
FIG. 9 is a plot showing recovery stress versus temperature for thermoplastic and radiation for a composition of this invention.

The DMA plots in FIGS. 4, 5, 6 and 7, cyclic free strain recovery comparisons in FIG. 8, and constrained recovery comparisons in FIG. 9 are evidence of both the existence of chemical crosslinking and of its effects on the mechanical properties of the SMP systems. The fact that all the materials in these plots had over 90% gel fractions is further confirmation that chemical crosslinking occurred.

From the characterization of the radiation-induced crosslinking mechanism demonstrated in these examples several conclusions could be drawn. First, the DCHMDI-containing samples did not appear suitable for radiation crosslinking at room temperature. One explanation for the DCHMDI monomer's inability to undergo radiation crosslinking is that the DCHMDI molecules in the polymer backbone experienced chain scission during irradiation, which prevented the formation of a large network structure. DCHMDI contains two cyclohexyl groups, which induce high stiffness on the polymer chains and therefore increase $T_g$. Because DCHMDI-containing samples have glass transitions significantly above room temperature, chain mobility is limited, and the probably that radical-containing chains will interact via radical graft polymerization to form crosslinks is decreased. The gel fractions of the DCHMDI-containing samples decreased proportionally with increasing $T_g$, as indicated in Table 2.

Second, the 2-butene-1, 4-diol monomer appears to be ideal for radiation crosslinking. Previous published research has shown that e-beam radiation can cause crosslinking in polyurethanes by ionizing the ⓐ-hydrogen adjacent to the carbamate oxygen in the urethane backbone and initiating a radical-based "graft" polymerization (instead of a radical chain polymerization), where radicals on different carbons form one-to-one chain-linking covalent bonds. The chemical structure of the thermoplastic urethane (Sample 1a) is provided in FIG. 11 (Structure I), and the ⓐ-hydrogens are shown in bold.

What is unique about this urethane is that the ⓐ-hydrogens are adjacent to the double bond from the 2-butene-1, 4-diol monomer. Consequently, when the radiation-induced radicals form, the radicals theoretically experience extended resonance stabilization along parts of the alcohol segment and through the carbamate linkages of the polymer backbone. We have proposed two possible resonance structures, which are Structures II and III in FIG. 11. This extended resonance stabilization gives the radicals more time to bond to other radicals and consequently increases crosslinking. The fact that the 1, 4-butanediol sample, if-R, had both a lower rubbery modulus at $T=T_g+20°$ C. and a lower gel fraction than its unsaturated counterpart indicates that the unsaturated group is involved in the crosslinking mechanism.

Example 2

To demonstrate that higher crosslink densities in the radiation crosslinked polymers, radiation sensitizers were solution blended with thermoplastic polyurethanes before irradiation. Linear, olefinic urethane polymers were made from 2-butene-1,4-diol, diethylene glycol, 1,4-butanediol, and trimethylhexamethylene diisocyanate (TMHDI). Radiation sensitizers enhance crosslinking because the vinyl groups are more sensitive to radiation induced radical formation but also because they have a combination of high functionality and small size. The chemical structures of these monomers are illustrated in Table 2. After irradiation, the samples were characterized by the methods described in Example 1.

TABLE 2

Structures for monomers and radiation sensitizers used in synthesis of polymers in Example 2

| Monomer Name | Structure |
| --- | --- |
| 2-butene-1,4-diol | HO—CH₂—CH=CH—CH₂—OH |
| diethylene glycol | HO—CH₂CH₂—O—CH₂CH₂—O—CH₂CH₂—OH |
| 1,4-butanediol | HO—(CH₂)₄—OH |
| trimethylhexamethylene diisocyanate (TMHDI) | OCN—CH₂C(CH₃)₂CH₂CH(CH₃)CH₂CH₂—NCO |
| pentaerithol triacrylate (PETA) | (CH₂=CH—C(O)—O—CH₂)₃C—CH₂OH |

TABLE 2-continued

Structures for monomers and radiation sensitizers
used in synthesis of polymers in Example 2

| Monomer Name | Structure |
|---|---|
| tris[2-(acryloyloxy)ethyl] isocyanurate (TAcIC) | *(structure shown)* |

Experimental

Thermoplastic urethane samples were prepared from 2-butene-1,4-diol and trimethylhexamethylene diisocyanate (TMHDI). These monomers were selected because our previous work had shown the corresponding thermoplastics to be highly susceptible to radiation crosslinking. To evaluate the effect of the double bond in the polymer backbone on radiation crosslinking, an analog of this thermoplastic was synthesized from 1,4-butanediol and TMHDI. To lower the $T_g$ of the samples, diethylene glycol (DEG) was also used as a substitute for 2-butene-1,4-diol. Samples were solution blended in THF with radiation sensitizers (TAcIC and PETA) in 2.5%, 5.0%, 10%, 20% and 25% molar ratios. To evaluate the effect of molecular weight on radiation crosslinking, molecular weight was controlled by adding anhydrous methanol in 1.0-5.0% mole ratios to the initial monomer mixtures.

All chemicals, unless otherwise stated, were purchased from TCI America and used as received. All thermoplastic urethanes were synthesized in a 33 vol % solution of anhydrous (>99.9%) THF. Zirconium(IV) 2,4-pentanedionate was purchased from Alfa Aesar and used as a catalyst (0.01 wt % of monomers) for the urethane polymerization. This catalyst was chosen because it has been shown to favor urethane formation over urea formation when moisture is present. All solvents, alcohol and isocyanate monomers, and catalysts were stored, massed, and mixed under dry air in a LabConco glove box. 100 g samples (total monomer mass) were massed in the glove box and put in 225 mL glass jars, after which the THF and Zr catalyst were added. The jars were sealed and were then placed in a LabConco RapidVap machine at 65° C. for 24 h at a vortex setting of 25 under dry nitrogen. The RapidVap was used to heat and mix the monomer solutions under an inert, moisture-free atmosphere. After 24 h, the viscous polymer solutions were poured into 12"×9" rectangular polypropylene (PP) dishes, which were purchased from McMaster-Carr. The PP dishes were then placed under vacuum at 65° C. for 72 h to remove solvent.

After the solvent was removed, the large thermoplastic films were cut into strips and put into 20 mL glass vials in masses of 4-5 g. All masses were recorded, and radiation sensitizer compositions necessary to make 2.5-25 mole % samples were calculated based on these masses. The thermoplastic strips were then re-dissolved in THF (33 vol % solution) using the heat and vortex features of the RapidVap overnight at 50° C. and at a 25 vortex setting. The radiation sensitizer monomers were then added in appropriate amounts, and the vials were topped off with THF to give a final (polymer+sensitizer):THF volume ratio of 1:4. 3.3 mL of each blended polymer solution was then added evenly to each compartment of 2"×4"×12 compartment PP boxes, which were purchased from McMaster-Carr. These volumetric amounts were calculated to give final films of about 0.30 mm thickness. The PP boxes were then placed under vacuum at ambient temperature for 2 days, after which the temperature was increased to 45° C. for an additional 2 days. The resulting amorphous thermoplastic films were then placed in 2"×2"×2 mil polyethylene bags. The samples were irradiated using a 10 MeV electron accelerator at 50, 100, 150, 200, 250, 300, and 500 kGy.

Characterization by Dynamic Mechanical Analysis

Figure 12:
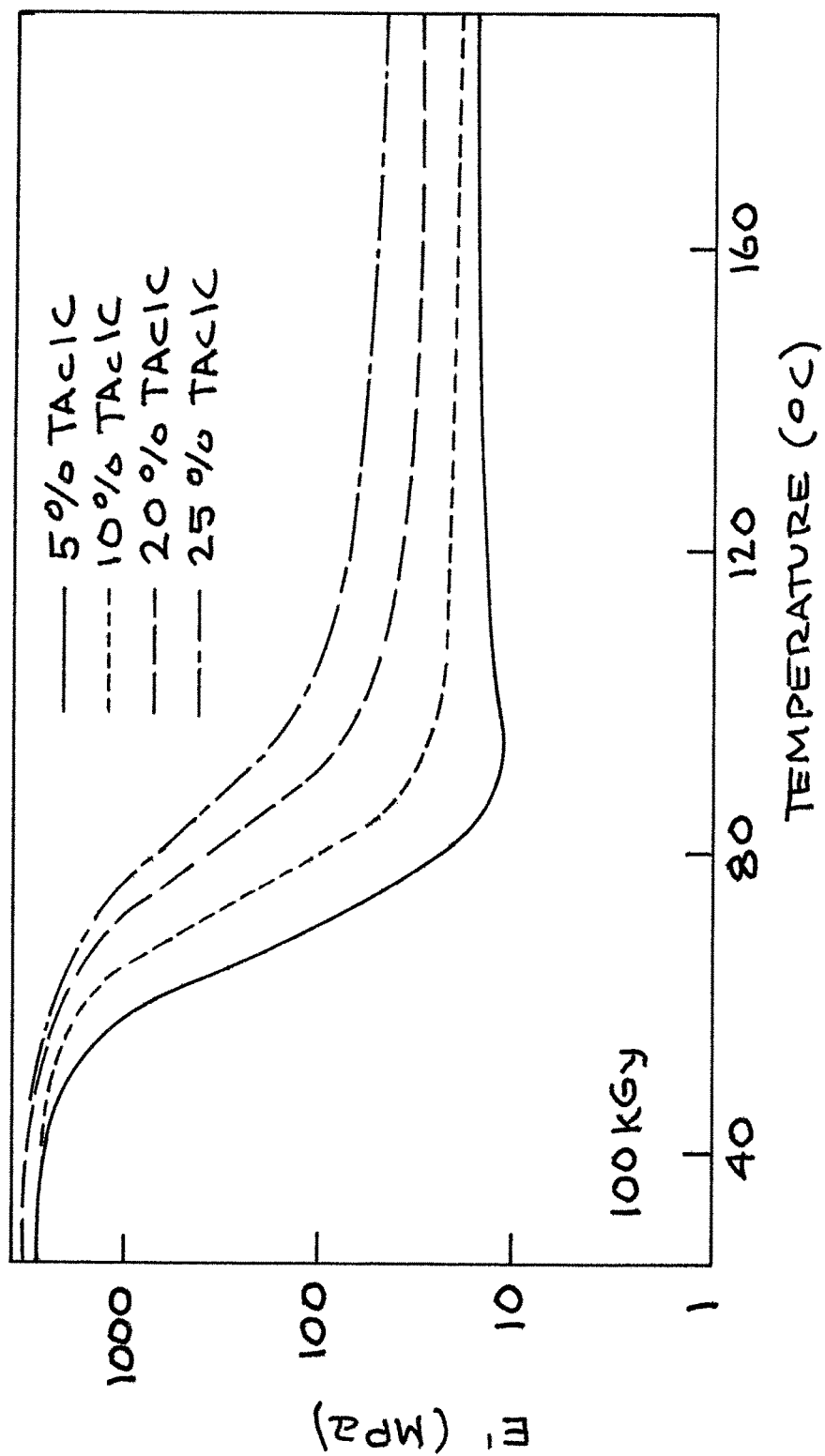
FIG. 12 is a plot of showing the effect of increased radiation sensitizer composition storage modulus for samples irradiated at 100 kGy.
Figure 13:
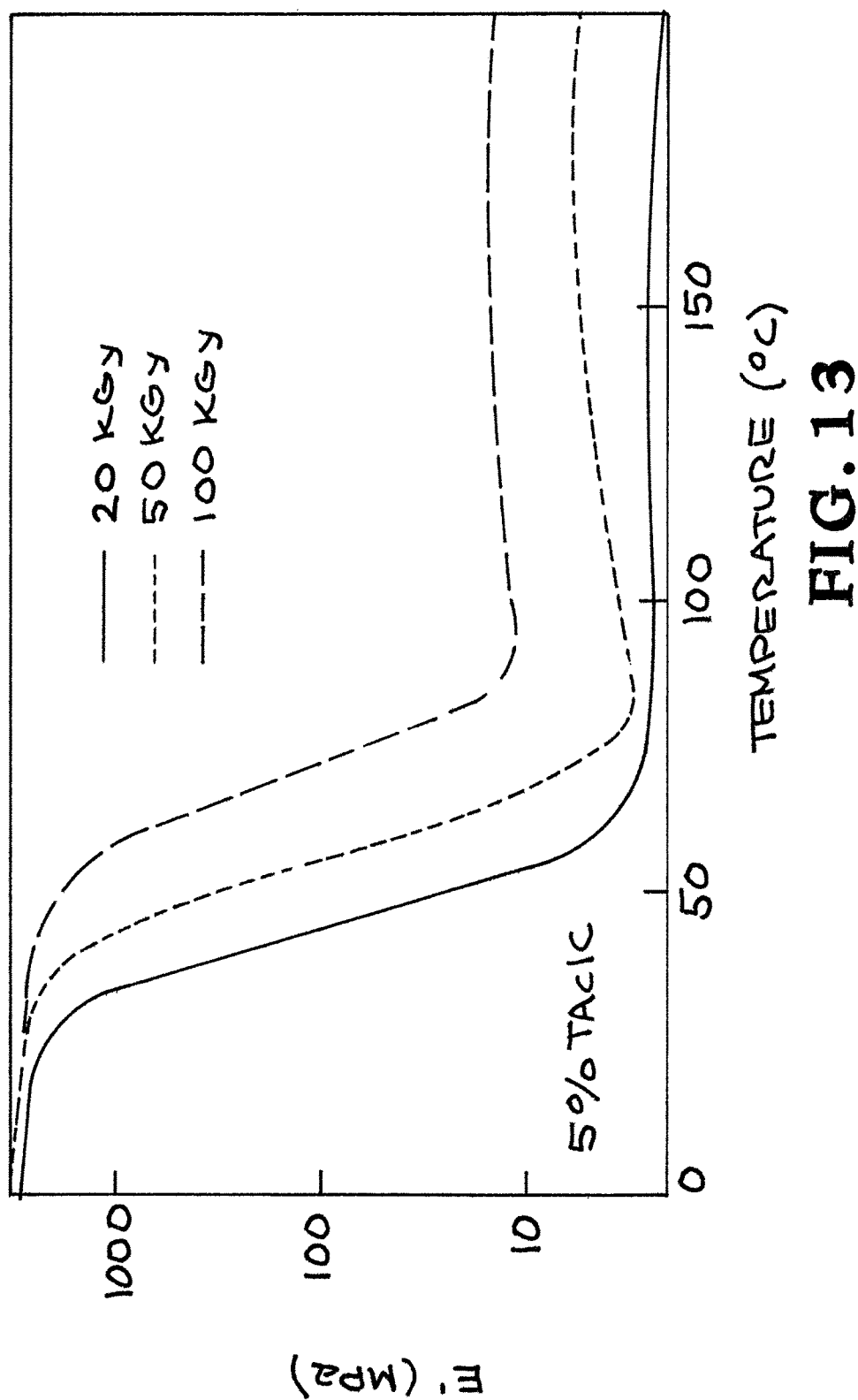
FIG. 13 is a plot showing the effect of increased radiation dose on storage modulus for thermoplastic samples solution blended with 5% TAcIC
Figure 14:
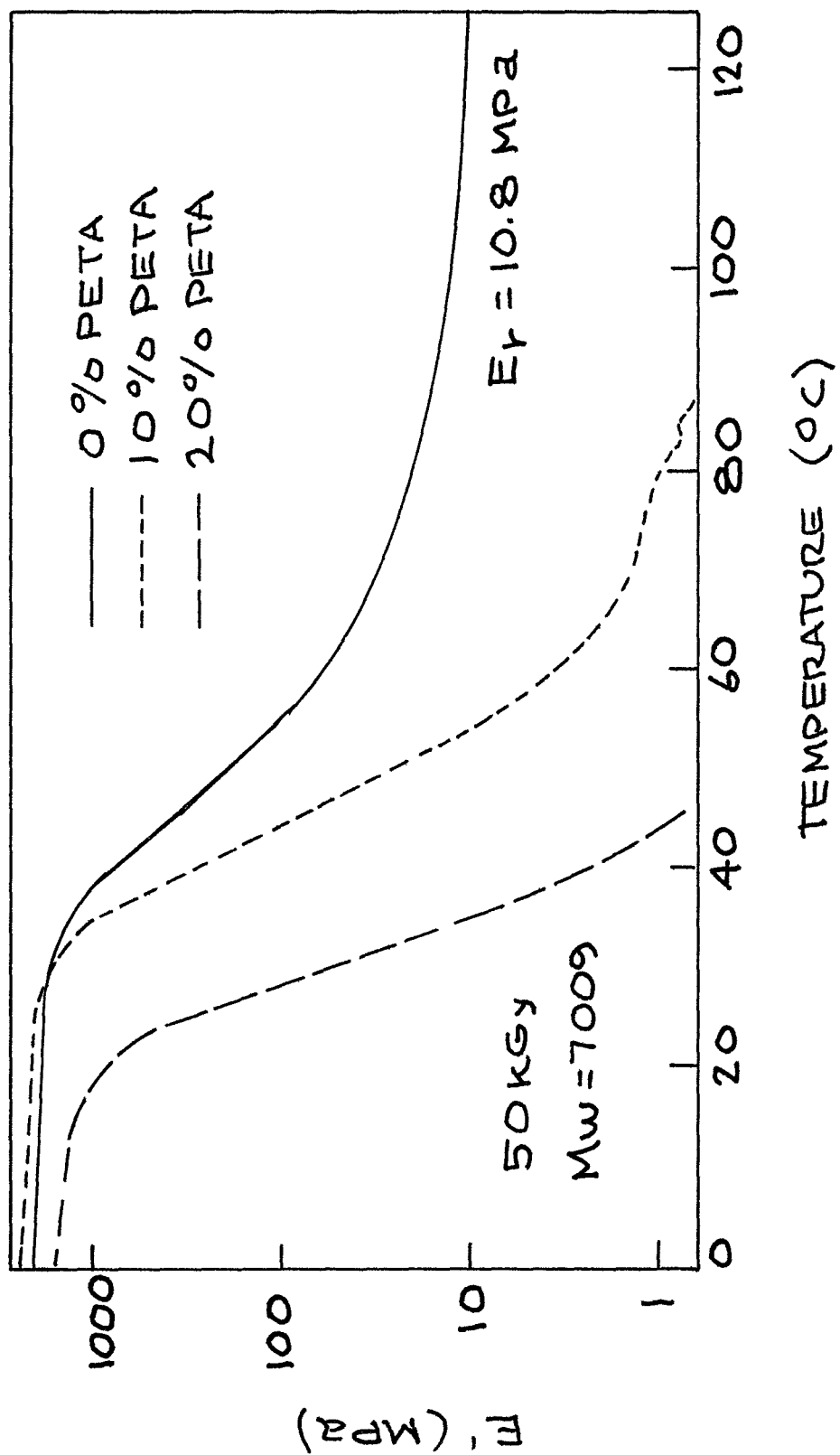
FIG. 14 is a plot showing the effect of increased PETA composition on storage modulus for thermoplastic samples irradiated at 50 kGy and with a low molecular weight ($M_w$=7009).
Figure 15:
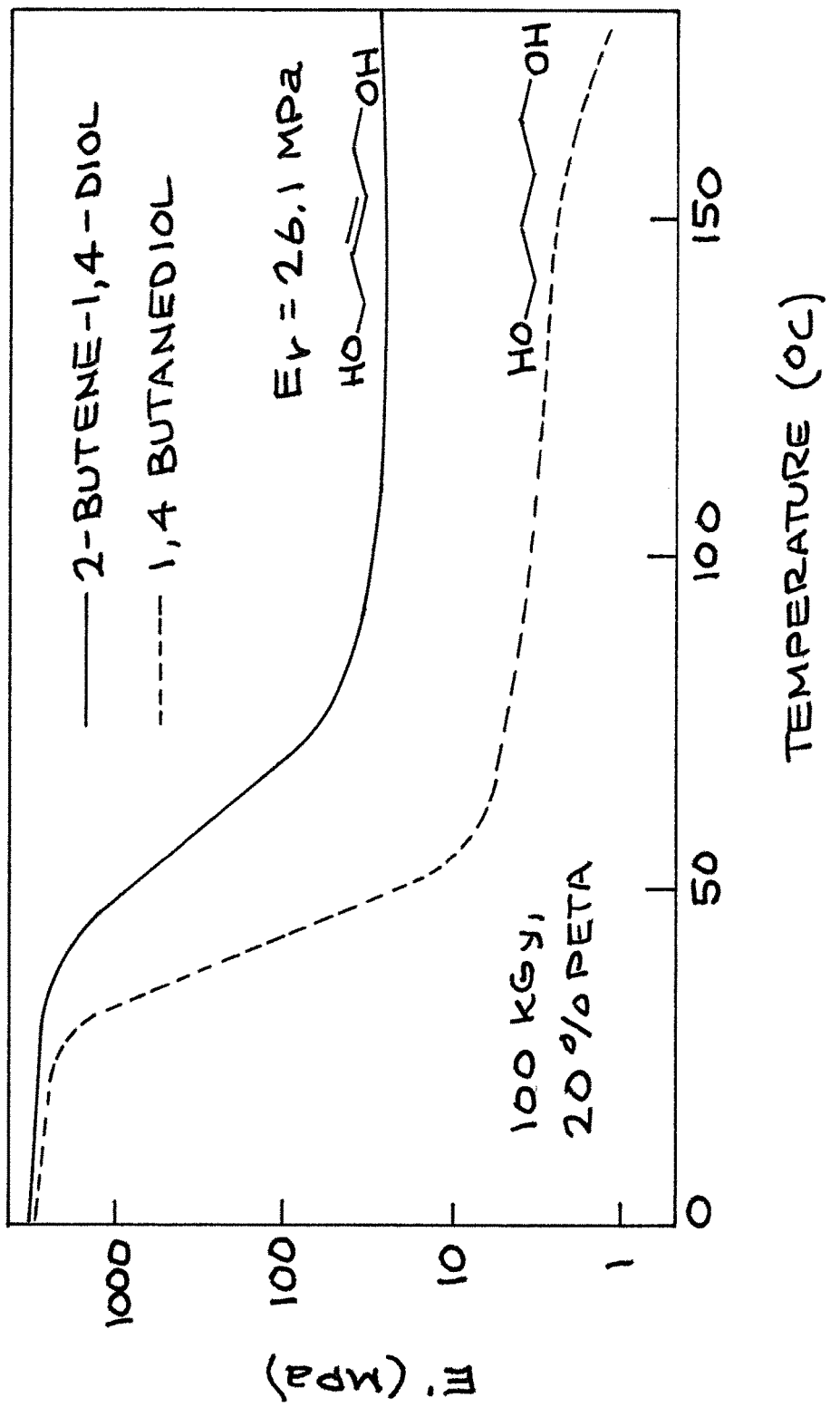
FIG. 15 is a plot showing the effect of the presence of a double bond in the beta position to the carbamate group in the diol segment of the polyurethane on storage modulus for thermoplastic samples irradiated at 100 kGy and solution blended with 20% sensitizer.
Figure 16A:
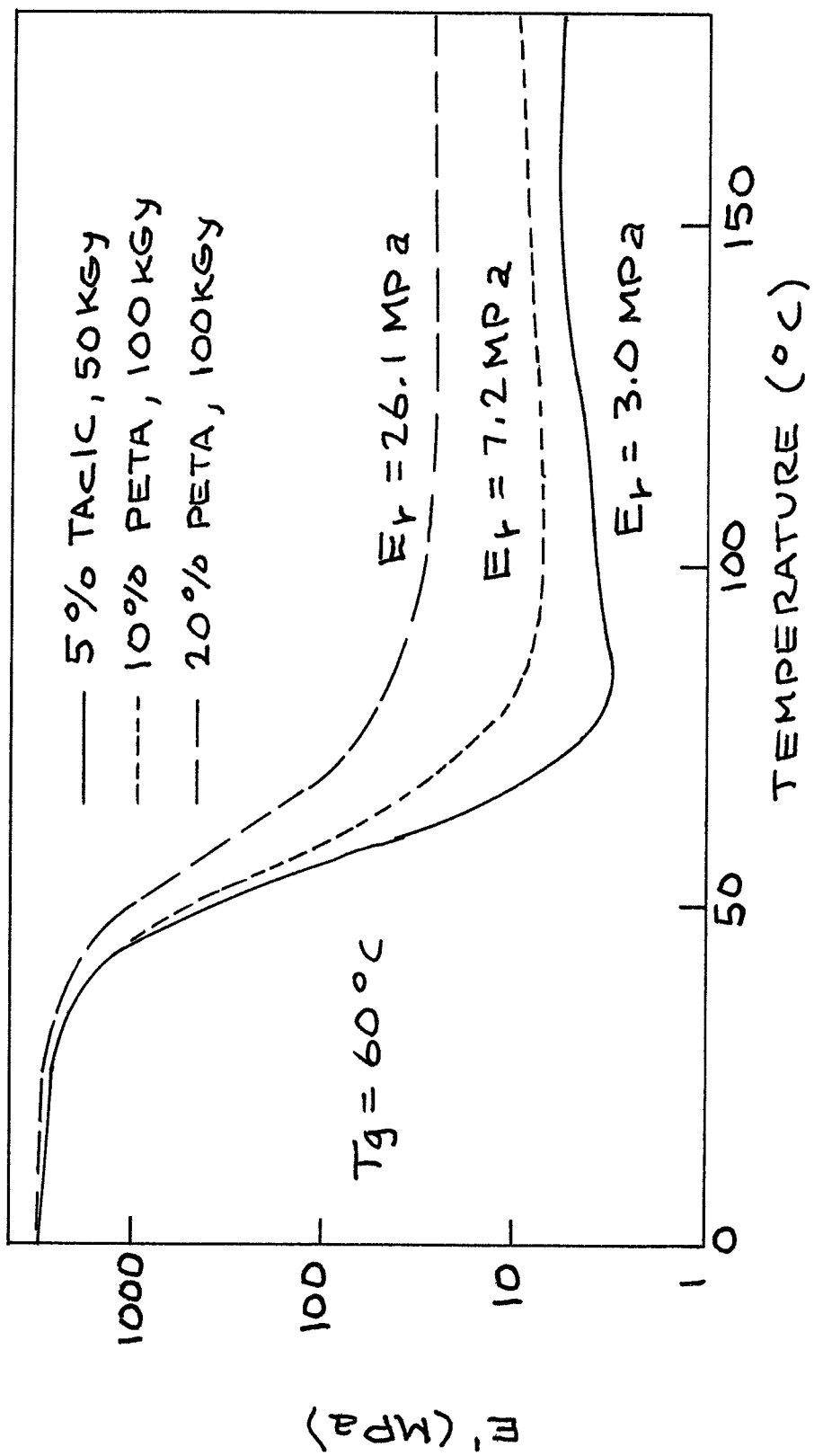
FIGS. 16a and 16b are plots respectively showing independence of rubbery modulus and glass transition temperature.
Figure 16B:
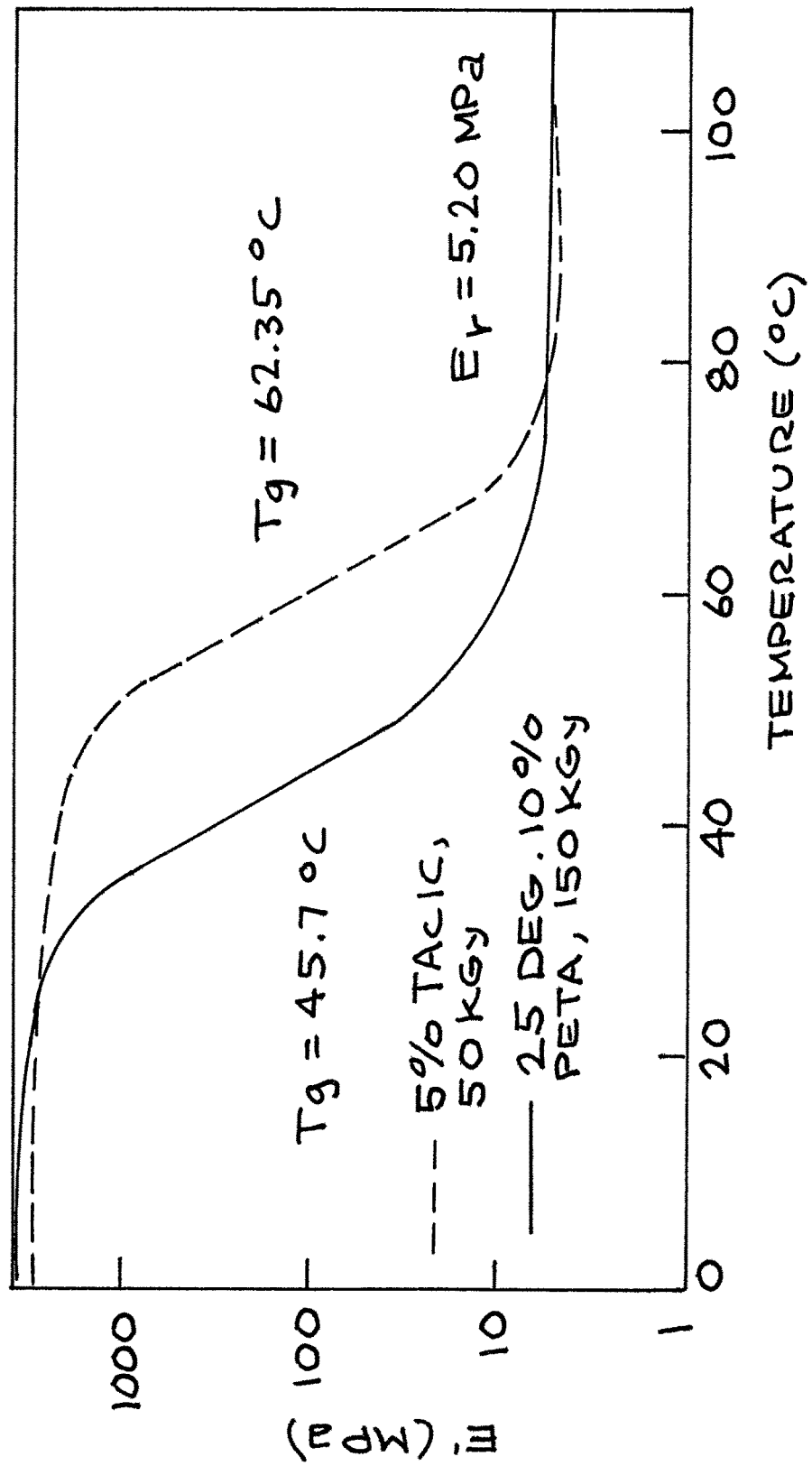
Figure 17:
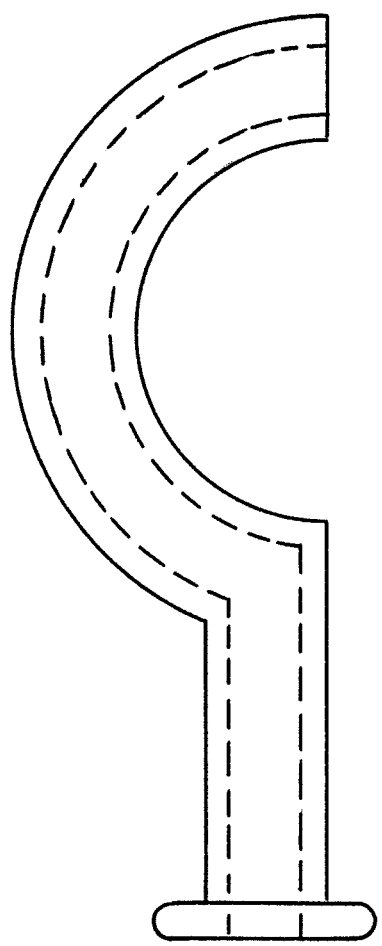
FIG. 17 is a picture showing a Complex medical device made from molding a composition of this invention and then irradiating it at 50 kGy.

Dynamic mechanical analysis experiments were performed on the thin film samples using the experimental parameters described in Example 1. As FIG. 12 shows, both rubbery modulus and $T_g$ increased with increasing sensitizer composition. Rubbery moduli as high as 70 MPa were achievable. As FIG. 13 shows, both rubbery modulus and $T_g$ increased with increasing radiation dose. As FIG. 14 shows, crosslinking was achievable for samples with extremely low molecular weights. Consequently, injection molding of these materials should be extremely easy. As FIG. 15 shows, the presence of a double bond in the beta position to the carbamate group in the diol segment of the urethane backbone resulted in a significantly higher rubbery modulus than the polymer containing the saturated analog; this plot serves as strong evidence for the validity of the resonance stabilization theory described in FIG. 11. As FIG. 16 shows, independent control of rubbery modulus and glass transition was achievable; consequently, this new urethane SMP system can be considered a true "SMP system," as has been defined in the literature.

Articles Made from the Polymers Systems of the Invention

In another embodiment the invention is shape memory article and devices made from the polymer composition of the invention. The polymer allows shaped articles to be formed and/or processed with the composition in the thermoplastic state, which is more efficient and less liable to form modification during process, then cured to a permanent shape memory thermoset state. This ability can be especially important in small article such as medical devices.

In another embodiment the polymer composition of the is invention are fabricated into a porous structure or foam by one or a combination of processes from the group of freeze drying, high inverse phase emulsion foaming, physical blowing, pore templating utilizing a solid or liquid pore former, solution spinning, stereolithographic patterning, micro-extrusion or ink pen printing, 3D microdot based printing, or laser machining.

Example 3

An experiment was run to demonstrate that a polyurethane composition of the invention could be processed as a thermoplastic and then subsequently crosslinked. Sample 1A was molded into the geometry of a complex medical device, pictured in FIG. 12. This device, an artificial oropharyngeal airway device, was exposed to radiation, during which it underwent radiation-induced chemical crosslinking, and after which it was shown to exhibit shape memory properties. Qualitative shape-recovery experiments were again run on the actual SMP-based airway device, and full recovery occurred in 14 seconds at body temperature.

In the foregoing specification, the invention has been described with reference to specific embodiments thereof. It will, however, be evident that various modifications and changes can be made thereto without departing from the broader spirit and scope of the invention as set forth in the appended claims. The specification is, accordingly, to be regarded in an illustrative rather than a restrictive sense. Therefore, the scope of the invention should be limited only by the appended claims.

The invention claimed is:

1. Articles of manufacture comprising:
a polymer composition comprising a thermoplastic polymer, having crosslinkable sites spaced along a polymer chain, which when crosslinked form a thermoset polymer having shape memory properties; and
the thermoset polymer formed by crosslinking the thermoplastic polymer;
wherein the thermoplastic polymer is at least one of a porous structure or foam fabricated by at least one of freeze drying, high inverse phase emulsion foaming, physical blowing, pore templating, solution spinning, stereolithographic patterning, extrusion, injection molding, solution casting, dip coating, thermoforming, compression molding, film blowing, ink pen printing, 3 D microdot based printing, laser machining, or combinations thereof.

2. The articles of manufacture of claim 1 wherein the crosslinkable sites are double bonds.

3. The articles of manufacture of claim 1 wherein the thermoset polymer is formed by crosslinking the thermoplastic polymer by at least one of heat, electron beam radiation, or combinations thereof.

4. The articles of manufacture of claim 1 wherein the thermoplastic and thermoset polymers are polyurethanes.

5. The articles of manufacture of claim 4 wherein monomers for the thermoplastic polymer include at least one of hexamethylene diisocyanate; trimethylhexamethylene diisocyanate; dicyclohexylmethane 4,4' diisocyanate; trans-1,4-cyclohexylene diisocyanate; 1,5-Diisocyanato-2-methylpentane; 2-butene-1,4-diol; 1,4-butanediol; 1,6-hexanediol; 1,8-octanediol; 1,10-decanediol; 1,6-hexanediylbis[oxy(2-hydroxy-3,1-propanediyl)] bisacrylate; bisphenol A glycerolate dimethacrylate; 3,4-dihydroxy-1-butene; 7-Octene-1,2-diol; pentaerythritol triacrylate; diethylene glycol; diethanolamine; hydroquinone bis(2-hydroxyethyl) ether; triethylene glycol, 1-(benzyloxymethyl) triethylene glycol; 2,2'-ethyliminodiethanol, or combinations thereof.

6. The articles of manufacture of claim 1 wherein the thermoplastic polymer has a backbone comprising, in the following order: an electron withdrawing group, a methylene or methyne carbon in the alpha position to the electron withdrawing group, and an unsaturated carbon-carbon double bond in the beta position to the electron withdrawing group.

7. The articles of manufacture of claim 1 wherein the thermoplastic polymer has a side chain comprising, in the following order: an electron withdrawing group, a methylene or methyne carbon in the alpha position to the electron withdrawing group, and an unsaturated carbon-carbon double bond in the beta position to the electron withdrawing group.

8. A method of making polymeric articles having shape memory properties comprising:
forming a thermoplastic linear or branched polymer having crosslinkable sites spaced along a polymer chain,
processing the thermoplastic polymer into a shape, the processing comprising fabricating the thermoplastic polymer into a porous structure or foam having the shape by at least one of freeze drying, high inverse phase emulsion foaming, physical blowing, pore templating, solution spinning, stereolithographic patterning, extrusion, ink pen printing, 3 D microdot based printing, injection molding, extrusion, solution casting, dip coating, thermoforming, compression molding, film blowing, laser machining, or combinations thereof; and
curing or crosslinking the thermoplastic polymer so that a thermoset polymer is formed that has the device shape and form as the permanent shape and may be made to take a stable secondary shape through the application of stress or strain at a temperature above its actuation transition, then held at the secondary shape while cooled to a temperature below its transition temperature.

9. The method of claim 8 wherein the curing or crosslinking includes a curing mechanism that includes at least one of:
(a) thermally or radiatively initiated radical crosslinking of vinyl groups,
(b) peroxide or sulfur based crosslinking of vinyl groups,
(c) thiol addition to vinyl,
(d) reaction of isocyanate containing curing agents with hydroxyl, carboxylic acid, or amine on the polymer chains,
(e) condensation of ester linkages,
(f) epoxy chemistry, silane and siloxane coupling reactions, or
(g) combinations thereof.

10. The method of claim 8 wherein the thermoplastic polymer is made from monomers, the monomers including at least one of hexamethylene diisocyanate; trimethylhexamethylene diisocyanate; dicyclohexylmethane 4,4' diisocyanate; trans-1,4-cyclohexylene diisocyanate; 1,5-Diisocyanato-2-methylpentane; 2-butene-1,4-diol; 1,4-butanediol; 1,6-hexanediol; 1,8-octanediol; 1,10-decanediol; 1,6-hexanediylbis[oxy(2-hydroxy-3,1-propanediyl)] bisacrylate; bisphenol A glycerolate dimethacrylate; 3,4-dihydroxy-1-butene; 7-Octene-1,2-diol; pentaerythritol triacrylate; diethylene glycol; diethanolamine; hydroquinone bis(2-hydroxyethyl) ether; triethylene glycol, 1-(benzyloxymethyl) triethylene glycol; 2,2'-ethyliminodiethanol, or combinations thereof.

11. The method of claim 8 wherein the thermoplastic polymer has a backbone or side chain comprising, in the following order: an electron withdrawing group, a methylene or methyne carbon in the alpha position to the electron withdrawing group, and an unsaturated carbon-carbon double bond in the beta position to the electron withdrawing group.

12. Articles of construction made by the method of claim 8.

13. The articles of claim 12 wherein the thermoplastic and thermoset polymers are polyurethanes.

14. The articles of claim 12 wherein the thermoplastic polymer has a backbone or side chain comprising, in the following order: an electron withdrawing group, a methylene or methyne carbon in the alpha position to the electron withdrawing group, and an unsaturated carbon-carbon double bond in the beta position to the electron withdrawing group.

15. The articles of manufacture of claim 2 wherein monomers for the thermoplastic polymer include at least one of hexamethylene diisocyanate; trimethylhexamethylene diisocyanate; dicyclohexylmethane 4,4' diisocyanate; trans-1,4-cyclohexylene diisocyanate; 1,5-Diisocyanato-2-methylpentane; 2-butene-1,4-diol; 1,4-butanediol; 1,6-hexanediol; 1,8-octanediol; 1, 10-decanediol; 1, 6-hexanediylbis[oxy(2-hydroxy-3, 1-propanediyl)] bisacrylate; bisphenol A glycerolate dimethacrylate; 3,4-dihydroxy-1-butene; 7-Octene-1,2-diol; pentaerythritol triacrylate; diethylene glycol; diethanolamine; hydroquinone bis(2-hydroxyethyl) ether; triethylene glycol, 1-(benzyloxymethyl) triethylene glycol; 2,2'-ethyliminodiethanol, or combinations thereof.

16. The articles of manufacture of claim 15 wherein the thermoplastic polymer has a backbone comprising, in the following order: an electron withdrawing group, a methylene or methyne carbon in the alpha position to the electron withdrawing group, and an unsaturated carbon-carbon double bond in the beta position to the electron withdrawing group.

17. The articles of manufacture of claim 4 wherein the thermoplastic polymer has a backbone comprising, in the following order: an electron withdrawing group, a methylene or methyne carbon in the alpha position to the electron withdrawing group, and an unsaturated carbon-carbon double bond in the beta position to the electron withdrawing group.

18. The articles of manufacture of claim 5 wherein the thermoplastic polymer has a backbone comprising, in the following order: an electron withdrawing group, a methylene or methyne carbon in the alpha position to the electron withdrawing group, and an unsaturated carbon-carbon double bond in the beta position to the electron withdrawing group.

19. The articles of manufacture of claim 2 wherein the thermoplastic polymer has a backbone comprising, in the following order: an electron withdrawing group, a methylene or methyne carbon in the alpha position to the electron withdrawing group, and an unsaturated carbon-carbon double bond in the beta position to the electron withdrawing group.

20. The articles of manufacture of claim 2 wherein the thermoplastic and thermoset polymers are polyurethanes.

21. The articles of manufacture of claim 20 wherein monomers for the thermoplastic polymer include at least one of hexamethylene diisocyanate; trimethylhexamethylene diisocyanate; dicyclohexylmethane 4,4' diisocyanate; trans-1,4-cyclohexylene diisocyanate; 1,5-Diisocyanato-2-methylpentane; 2-butene-1,4-diol; 1,4-butanediol; 1,6-hexanediol; 1, 8-octanediol; 1, 10-decanediol; 1,6-hexanediylbis[oxy(2-hydroxy-3, 1-propanediyl)] bisacrylate; bisphenol A glycerolate dimethacrylate; 3,4-dihydroxy-1-butene; 7-Octene-1,2-diol; pentaerythritol triacrylate; diethylene glycol; diethanolamine; hydroquinone bis(2-hydroxyethyl) ether; triethylene glycol, 1-(benzyloxymethyl) triethylene glycol; 2,2'-ethyliminodiethanol, or combinations thereof.

22. The articles of manufacture of claim 21 wherein the thermoplastic polymer has a backbone comprising, in the following order: an electron withdrawing group, a methylene or methyne carbon in the alpha position to the electron withdrawing group, and an unsaturated carbon-carbon double bond in the beta position to the electron withdrawing group.

23. The articles of manufacture of claim 21 wherein the thermoplastic polymer has a side chain comprising, in the following order: an electron withdrawing group, a methylene or methyne carbon in the alpha position to the electron withdrawing group, and an unsaturated carbon-carbon double bond in the beta position to the electron withdrawing group.

24. The articles of manufacture of claim 1 wherein the thermoplastic polymer has crosslinkable sites substantially regularly spaced along the polymer chain.

25. The articles of manufacture of claim 1 wherein the thermoset polymer has: (a) a glass transition temperature (Tg) between 25 degrees Celsius and 80 degrees Celsius, (b) a gel fraction of at least 90%, and (c) a percent strain recovery of at least 94%.

26. The articles of manufacture of claim 1 wherein the thermoset polymer has a glass transition temperature (Tg) between 37 and 42 degrees Celsius.

* * * * *

UNITED STATES PATENT AND TRADEMARK OFFICE
CERTIFICATE OF CORRECTION

PATENT NO. : 10,494,470 B2
APPLICATION NO. : 15/387256
DATED : December 3, 2019
INVENTOR(S) : Thomas S. Wilson, Michael Keith Hearon and Jane P. Bearinger It is certified that error appears in the above-identified patent and that said Letters Patent is hereby corrected as shown below:

In the Specification

Column 13:

Line 26, "⊚-hydrogen" should be --α-hydrogen--; and

Line 33, "⊚-hydrogens" should be --α-hydrogens--; and

Column 14:

Line 1, "⊚-hydrogens" should be --α-hydrogens--.

Signed and Sealed this
Thirteenth Day of February, 2024

*Katherine Kelly Vidal*

Katherine Kelly Vidal
*Director of the United States Patent and Trademark Office*